(12) United States Patent
Lee

(10) Patent No.: US 11,231,747 B2
(45) Date of Patent: Jan. 25, 2022

(54) DISPLAY DEVICE

(71) Applicant: Samsung Display Co., LTD., Yongin-si (KR)

(72) Inventor: Jung-il Lee, Seoul (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/733,600

(22) Filed: Jan. 3, 2020

(65) Prior Publication Data

US 2020/0233464 A1 Jul. 23, 2020

(30) Foreign Application Priority Data

Jan. 17, 2019 (KR) .................. 10-2019-0006219

(51) Int. Cl.
*G06F 1/16* (2006.01)

(52) U.S. Cl.
CPC .......... *G06F 1/1652* (2013.01); *G06F 1/1616* (2013.01); *G06F 1/1622* (2013.01); *G06F 1/1681* (2013.01)

(58) Field of Classification Search
CPC ...... G06F 1/1616; G06F 1/162; G06F 1/1633; G06F 1/1641; G06F 1/1652
See application file for complete search history.

(56) References Cited

U.S. PATENT DOCUMENTS

| 6,466,369 B1* | 10/2002 | Maddock | G03B 21/30 |
| | | | 348/E5.143 |
| 8,738,101 B1* | 5/2014 | Myr | G06F 1/1616 |
| | | | 455/575.1 |
| 9,516,775 B2 | 12/2016 | Park | |
| 9,541,962 B2 | 1/2017 | Siddiqui | |
| 10,054,990 B1 | 8/2018 | Harmon | |
| 2007/0279315 A1 | 12/2007 | Laves et al. | |

(Continued)

FOREIGN PATENT DOCUMENTS

| GB | 2517782 A | 3/2016 |
| KR | 1020100092222 A | 8/2010 |

(Continued)

OTHER PUBLICATIONS

EP European Search Report for European Patent Application No. 20151887.5 dated May 20, 2020.

(Continued)

*Primary Examiner* — Anthony Q Edwards
(74) *Attorney, Agent, or Firm* — Cantor Colburn LLP

(57) ABSTRACT

A display device is capable of substantially preventing damage to a display panel and a hinge portion, the display device including: a panel support portion including a first support portion, a second support portion, and a third support portion; a first hinge portion connecting the first support portion and the second support portion; a second hinge portion connecting the second support portion and the third support portion; a flexible display panel disposed on the panel support portion; and a hinge controller controlling each of the first hinge portion and the second hinge portion to be rotatable or unrotatable based on a first angle between the second support portion and the first support portion and a second angle between the second support portion and the third support portion.

25 Claims, 21 Drawing Sheets

(56) References Cited

U.S. PATENT DOCUMENTS

| | | | |
|---|---|---|---|
| 2010/0201604 A1* | 8/2010 | Kee | G06F 1/1641 345/1.3 |
| 2011/0216064 A1* | 9/2011 | Dahl | G06F 1/1677 345/428 |
| 2012/0264489 A1* | 10/2012 | Choi | H04M 1/0268 455/566 |
| 2013/0286553 A1 | 10/2013 | Vanska et al. | |
| 2015/0022436 A1* | 1/2015 | Cho | G06F 3/147 345/156 |
| 2015/0227224 A1* | 8/2015 | Park | G06F 1/1643 345/173 |
| 2015/0227225 A1* | 8/2015 | Park | G06F 3/0488 345/173 |
| 2015/0261259 A1* | 9/2015 | Endo | G06F 1/1618 361/679.06 |
| 2016/0357489 A1* | 12/2016 | Dong | G06F 1/1641 |
| 2017/0208157 A1 | 7/2017 | Kim et al. | |
| 2017/0208699 A1 | 7/2017 | Mcdermid | |
| 2018/0210508 A1* | 7/2018 | Aurongzeb | G06F 1/1652 |
| 2019/0086964 A1 | 3/2019 | Hong | |
| 2020/0192529 A1* | 6/2020 | Li | G06F 3/04886 |

FOREIGN PATENT DOCUMENTS

| | | |
|---|---|---|
| KR | 101029935 B1 | 4/2011 |
| KR | 1020150064883 A | 6/2015 |
| KR | 1020160103600 A | 9/2016 |
| KR | 1020170072250 A | 6/2017 |
| KR | 10-1866507 A | 6/2018 |
| WO | 2013076710 A2 | 5/2013 |
| WO | 2016/203321 A2 | 12/2016 |

OTHER PUBLICATIONS

EP European Search Report for European Patent Application No. 20151887.5 dated Sep. 22, 2020.

* cited by examiner

DISPLAY DEVICE

This application claims priority to Korean Patent Application No. 10-2019-0006219, filed on Jan. 17, 2019, and all the benefits accruing therefrom under 35 U.S.C. § 119, the disclosure of which is incorporated by reference herein in its entirety.

BACKGROUND

1. Field

Embodiments of the invention relate to a display device for which damage to a display panel and a hinge portion are substantially prevented.

2. Description of the Related Art

A flexible display device or a foldable display device includes a display panel that is bendable. Such a display device may include two or more hinge portions. In such a case, when portions of the display device are respectively rotated and in-folded simultaneously, interference may occur with another portion of the display device. In such a case, the display panel and the hinge portion may be damaged.

SUMMARY

Embodiments of the invention are directed to a display device for which damage to a display panel and a hinge portion by folding of the display device is substantially prevented.

According to an embodiment, a display device includes: a panel support portion including a first support portion, a second support portion, and a third support portion; a first hinge portion connecting the first support portion and the second support portion; a second hinge portion connecting the second support portion and the third support portion; a flexible display panel disposed on the panel support portion; and a hinge controller controlling each of the first hinge portion and the second hinge portion to be rotatable or unrotatable based on a first angle between the second support portion and the first support portion and a second angle between the second support portion and the third support portion.

The first hinge portion may include: a first coupling portion connected to a first connection portion of the first support portion and a first connection portion of the second support portion; and a second coupling portion connected to a second connection portion of the first support portion and a second connection portion of the second support portion.

The second hinge portion may include: a plurality of third coupling portions connected to a third connection portion of the second support portion and a first connection portion of the third support portion; and a plurality of fourth coupling portions connected to a fourth connection portion of the second support portion and a second connection portion of the third support portion.

The hinge controller may include: a first hinge controller connected to the first coupling portion and the plurality of third coupling portions; and a second hinge controller connected to the second coupling portion and the plurality of fourth coupling portions.

The first hinge controller may include: a first stopper disposed in the first coupling portion; a first spring connected to the first support portion; and a first wire extending from the first spring to pass through through holes of the first coupling portion, a support hole of the first stopper, and through holes of the plurality of third coupling portions, and connected to the third support portion.

The first coupling portion may include: a first rotary shaft connected to the first connection portion of the first support portion; a second rotary shaft connected to the first connection portion of the second support portion; a first gear including a shaft connected to the first rotary shaft; a second gear including a shaft connected to the second rotary shaft; a third gear connected to the first gear; and a fourth gear connected to the third gear and the second gear.

The first stopper may include: a body portion rotatably coupled to the first coupling portion; a support portion protruding from one end portion of the body portion, and having the support hole; and a securing portion protruding from another end portion of the body portion, and disposed between the first gear and the second gear.

A diameter of each of the through holes of the plurality of third coupling portions may be greater than a diameter of the first wire.

The second hinge controller may include: a second spring connected to the third support portion; a second wire extending from the second spring to pass through through holes of the plurality of fourth coupling portions and through holes of the second coupling portion, and connected to the first support portion; and a plurality of second stoppers disposed between the fourth coupling portions or in the through holes of the fourth coupling portions, and protruding from the second wire.

The display device may further include a plurality of connection shafts disposed between adjacent ones of the fourth coupling portions, and hingedly connecting the adjacent ones of the fourth coupling portions.

The plurality of connection shafts may have magnetic properties, and the second stoppers include a metal material.

The display device may further include a plurality of magnets surrounding the plurality of connection shafts. The second stoppers include a metal material.

The second stopper may include: a body portion; and a plurality of extension portions extending from the body portion and having a curved or straight shape.

A diameter of each of the through holes of the plurality of fourth coupling portions may be greater than a diameter of the second wire.

The first angle may be in a range from about zero degree to about 180 degrees, and the second angle is in a range from about zero degree to about 360 degrees.

When the first angle is greater than about zero degree and substantially equal to or less than about 180 degrees, and the second angle is about 180 degrees, the hinge controller may control the first hinge portion to be rotatable, and controls the second hinge portion to be unrotatable.

When the first angle is about zero degree, and the second angle is about 180 degrees, the hinge controller may control each of the first hinge portion and the second hinge portion to be rotatable.

When the first angle is about zero degree, and the second angle is less than about 180 degrees, the hinge controller may control the first hinge portion to be unrotatable, and controls the second hinge portion to be rotatable.

When the first angle is about zero degree, and the second angle is greater than about 180 degrees and substantially equal to or less than about 360 degrees, the hinge controller may control the first hinge portion to be unrotatable, and controls the second hinge portion to be rotatable.

According to an embodiment, a display device includes: a panel support portion including n number of support portions, n being a natural number greater than 2; n−1 number of hinge portions connecting adjacent ones of the support portions; a flexible display panel disposed on the panel support portion; and a hinge controller controlling the n−1 number of hinge portions to be rotatable or unrotatable based on an angle between adjacent ones of the support portions.

The foregoing is illustrative only and is not intended to be in any way limiting. In addition to the illustrative embodiments and features described above, further embodiments and features will become apparent by reference to the drawings and the following detailed description.

BRIEF DESCRIPTION OF THE DRAWINGS

A more complete appreciation of the invention will become more apparent by describing in detail embodiments thereof with reference to the accompanying drawings, where.

DETAILED DESCRIPTION

Figure 1:
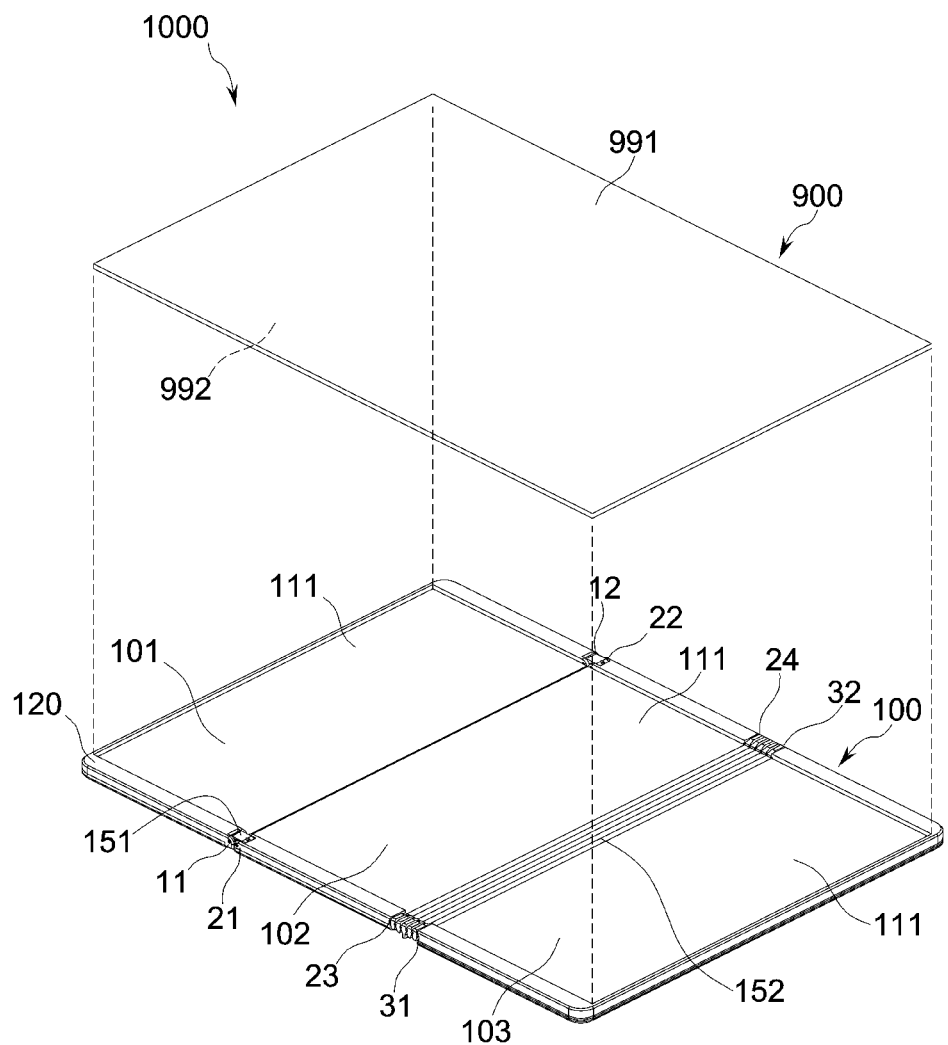
FIG. 1 is a perspective view illustrating an embodiment of a display device.
Figure 1:
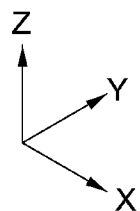

Embodiments will now be described more fully hereinafter with reference to the accompanying drawings. Although the invention may be modified in various manners and have several embodiments, embodiments are illustrated in the accompanying drawings and will be mainly described in the specification. However, the scope of the invention is not limited to the embodiments and should be construed as including all the changes, equivalents and substitutions included in the spirit and scope of the invention.

In the drawings, thicknesses of a plurality of layers and areas are illustrated in an enlarged manner for clarity and ease of description thereof. When a layer, area, or plate is referred to as being related to another element such as being "on" or "below" another layer, area, or plate, it may be directly on or below the other layer, area, or plate, or intervening layers, areas, or plates may be present therebetween. Conversely, when a layer, area, or plate is referred to as being related to another layer such as being "directly on" or "directly below" another layer, area, or plate, intervening layers, areas, or plates are absent therebetween.

The spatially relative terms "below," "beneath," "lower," "above," "upper" and the like, may be used herein for ease of description to describe the relations between one element or component and another element or component as illustrated in the drawings. It will be understood that the spatially relative terms are intended to encompass different orientations of the device in use or operation, in addition to the orientation illustrated in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction and thus the spatially relative terms may be interpreted differently depending on the orientations.

Throughout all portions of this disclosure, when an element is referred to as being "connected" to another element, the element is mechanically or physically directly connected to the other element such as being in direct contact therewith, or "electrically connected" to the other element with one or more intervening elements interposed therebetween.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10% or 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined at the present specification.

Some of the parts which are not associated with the description may not be provided in order to specifically describe embodiments of the invention and like reference numerals refer to like elements throughout the specification.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a display device will be described in detail with reference to FIGS. 1 to 30.

Figure 2:
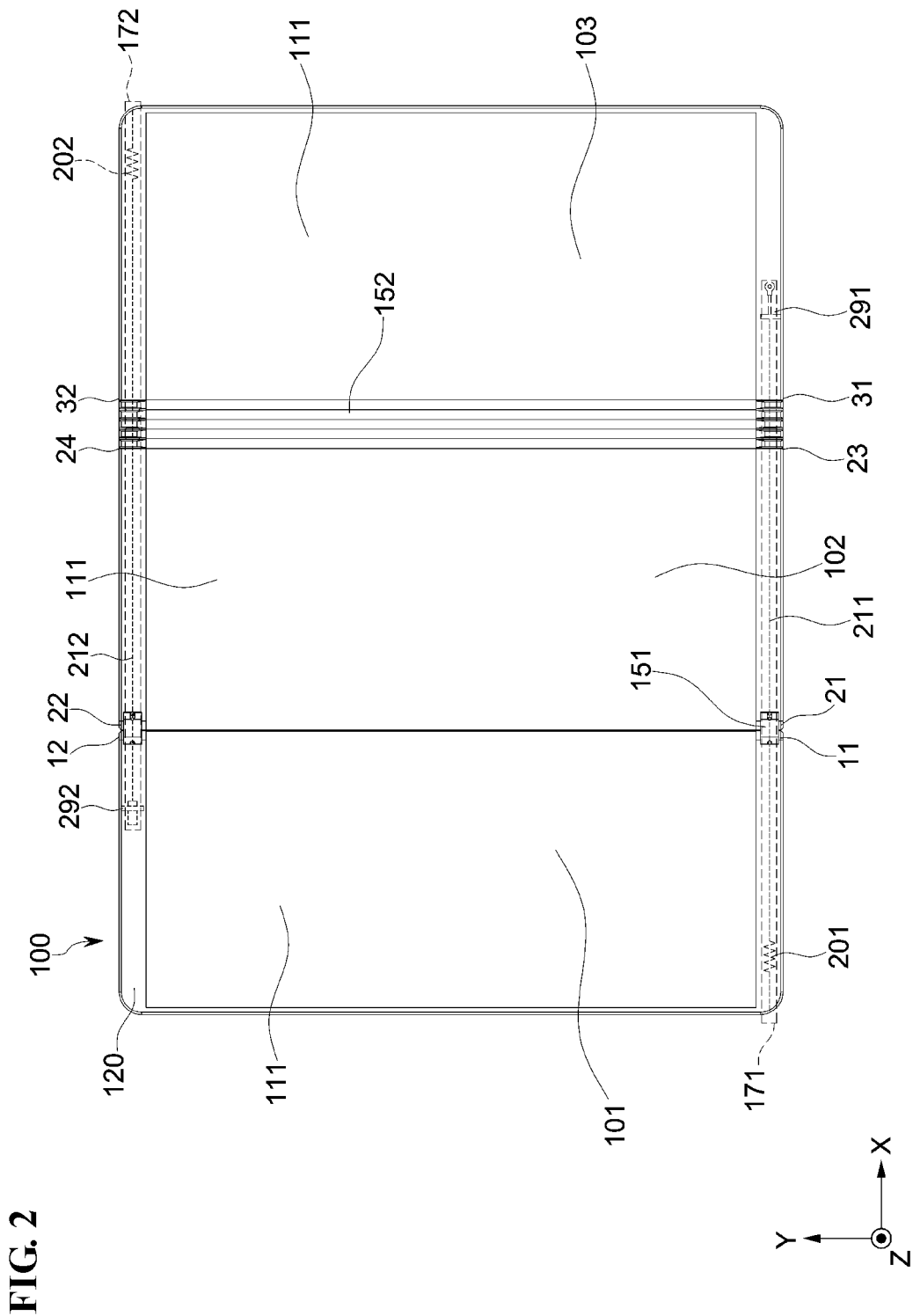
FIG. 2 is an embodiment of a front view of FIG. 1.
Figure 3:
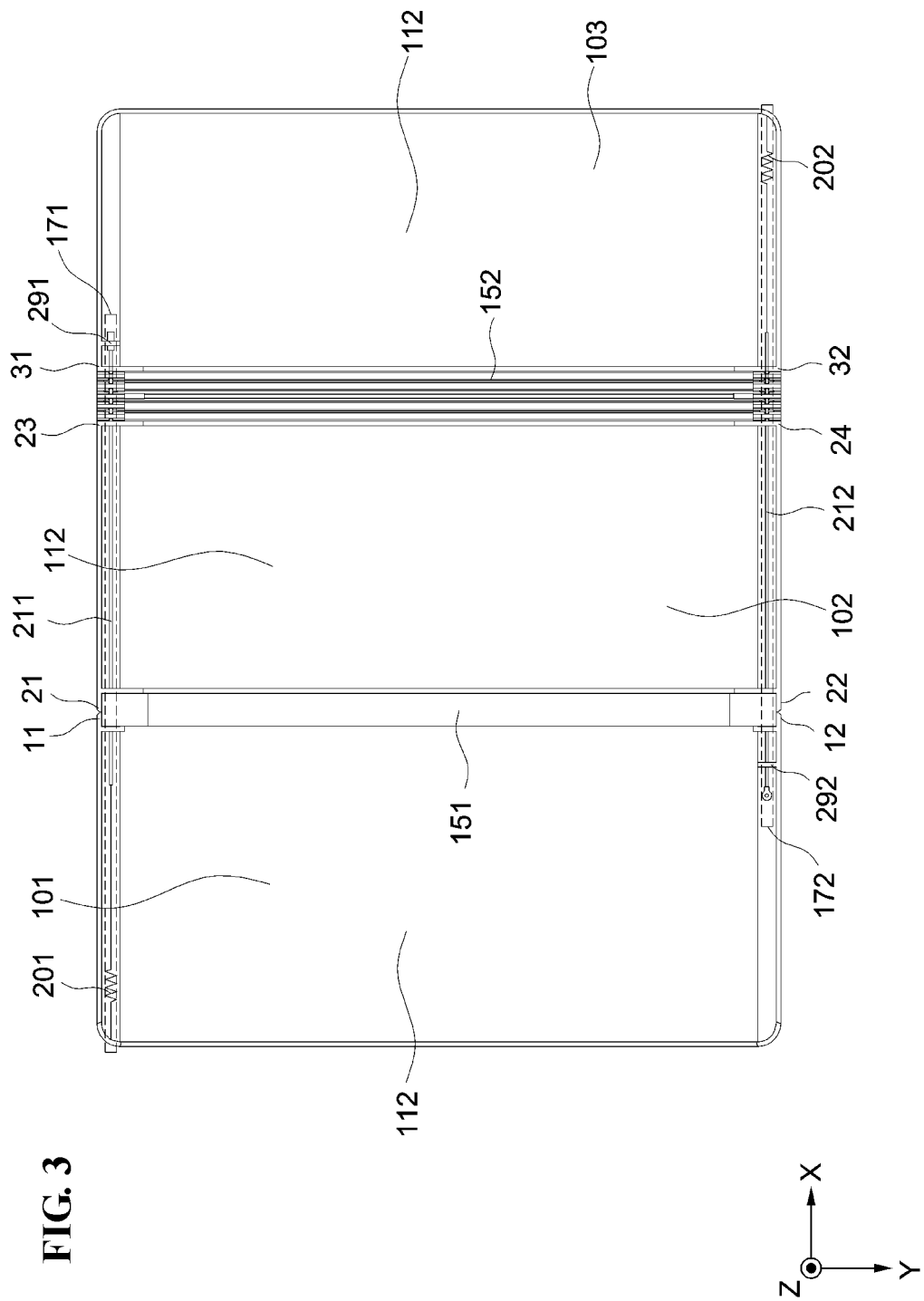
FIG. 3 is an embodiment of a rear view of FIG. 1.

FIG. 1 is a perspective view illustrating an embodiment of a display device, FIG. 2 is an embodiment of a front view of FIG. 1, and FIG. 3 is an embodiment of a rear view of FIG. 1.

As illustrated in FIGS. 1 to 3, a display device 1000 may include a panel support portion 100, hinge portions 151 and 152, hinge controllers 171 and 172, and a display panel 900.

The panel support portion 100 may include a support surface 111 and a protruding portion 120 disposed at an edge of the support surface 111. The protruding portion 120 may protrude from the edge of the support surface 111 along a Z-axis direction. A height of the protruding portion 120 is higher than a height of the support surface 111. As used herein, the height of the protruding portion 120 and the height of the support surface 111 mean the dimension thereof in the Z-axis direction.

The panel support portion 100 may include a plurality of support portions 101, 102 and 103, each of which may be referred to as a panel support portion. In an embodiment, for example, the panel support portion 100 may include first, second, and third support portions 101, 102, and 103. The second support portion 102 may be disposed between the first support portion 101 and the third support portion 103. The protruding portion 120 on the first support portion 101 is not connected to the protruding portion 120 on the second support portion 102 and the protruding portion 120 on the third support portion 103. The protruding portion 120 on the second support portion 102 is not connected to the protruding portion 120 on the first support portion 101 and the protruding portion 120 on the third support portion 103. The protruding portion 120 on the third support portion 103 is not connected to the protruding portion 120 on the first support portion 101 and the protruding portion 120 on the second support portion 102. In other words, the protruding portions 120 on different support portions among the first, second, and third support portions 101, 102, and 103 are separated from each other.

As illustrated in FIG. 1 and FIG. 2, along a plane defined by an X-axis direction and a Y-axis direction, the protruding portion 120 on the first support portion 101 may have a shape of "[", the protruding portion 120 on the second support portion 102 may have a shape of "=," and the protruding portion 120 on the third support portion 103 may have a shape of "]".

The hinge portions 151 and 152 may include a plurality of hinge portions 151 and 152. In an embodiment, for example, the hinge portions 151 and 152 may include hinge portions of which the number is one less than the support portions of the panel support portion 100. As a specific example, in a case where the panel support portion 100 includes the first, second, and third support portions 101, 102, and 103, the hinge portions 151 and 152 may include a first hinge portion 151 and a second hinge portion 152.

The hinge portions 151 and 152 may be respectively disposed between adjacent ones of the support portions. In an embodiment, for example, the first hinge portion 151 may be disposed between the first support portion 101 and the second support portion 102 that are adjacent to each other, and the second hinge portion 152 may be disposed between the second support portion 102 and the third support portion 103 that are adjacent to each other. In other words, a panel support portion 100 overall includes n support portions, n being a natural number greater than 2, and n−1 hinge portions connecting adjacent support portions among the n support portions to each other. The display panel 900 is disposed on each of the n support portions among the panel support portion 100.

The first support portion 101 is rotatably connected to the first hinge portion 151, the second support portion 102 is rotatably connected to both the first hinge portion 151 and the second hinge portion 152, and the third support portion 103 is rotatably connected to the second hinge portion 152. In an embodiment, for example, a first connection portion 11 and a second connection portion 12 of the first support portion 101 are rotatably connected to the first hinge portion 151, a first connection portion 21 and a second connection portion 22 of the second support portion 102 are rotatably connected to the first hinge portion 151, a third connection portion 23 and a fourth connection portion 24 of the second support portion 102 are rotatably connected to the second hinge portion 152, and a first connection portion 31 and a second connection portion 32 of the third support portion 103 are rotatably connected to the second hinge portion 152.

The first, second, and third support portions 101, 102, and 103 may be rotatable by a predetermined angle with respect to the hinge portions 151 and 152. In an embodiment, for example, the first support portion 101 may rotate about 180 degrees about the first hinge portion 151 which serves as a rotation axis, and the third support portion 103 may rotate about 360 degrees (e.g., 180 degrees in a counterclockwise direction and 180 degrees in a clockwise direction) about the second hinge portion 152 which serves as a rotation axis. Each rotation axis may be extended along the Y-axis direction.

In a view along the Y-axis direction in FIG. 1, the first support portion 101 is rotatable toward the support surface 111 of the second support portion 102 (e.g., clockwise about the first hinge portion 151). However, the first support portion 101 may not rotate toward a back surface 112 of the second support portion 102 (e.g., not counterclockwise about the first hinge portion 151). In the view along the Y-axis direction, the third support portion 103 is rotatable toward both the support surface 111 (e.g., counterclockwise about the second hinge portion 152) of the second support portion 102 and the back surface 112 of the second support portion 102 (e.g., clockwise about the second hinge portion 152). In other words, relative to the positions of elements shown in FIG. 1 where the display device 1000 is disposed flat, the first support portion 101 may be in-folded toward the support surface 111 of the second support portion 102 (e.g., in a clockwise direction), and the third support portion 103 may be not only in-folded toward the support surface 111 of the second support portion 102 (e.g., in the counterclockwise direction) but also out-folded toward the back surface 112 of the second support portion 102 (e.g., in the clockwise direction).

The display panel 900 is disposed on the panel support portion 100. In an embodiment, for example, the display panel 900 may be disposed on the support surface 111 of the panel support portion 100. The support surface 111 as a front surface of the panel support portion 100 faces a back surface 992 of the display panel 900. The back surface 992 of the display panel 900 is opposite to a display surface 991 of the display panel 900. The display panel 900 provides images through the display surface 991. The back surface 992 of the display panel 900 may be disposed between the display surface 991 of the display panel 900 and the support surface 111 of the panel support portion 100 along a thickness direction (e.g., Z-axis direction) of the display device 1000. The display panel 900 disposed on the support surface 111 of the panel support portion 100 may be enclosed by the protruding portion 120 of the panel support portion 100. That is, an entirety of the display panel 900 disposed on the support surface 111 may be essentially surrounded by all the portions of the protruding portion 120 which are disconnected from each other to function as a sidewall protruded from respective edges of the panel support portion 100.

The display panel 900 may be a flexible display panel 900 or a foldable display panel 900. In such an embodiment, the display panel 900 may be a light emitting display panel 900 or a liquid crystal display panel 900. In such an embodiment, the light emitting display panel 900 may be an organic light emitting diode ("OLED") display panel 900. The display panel 900 may be bendable at the first hinge portion 151 together with rotation of the first support portion 101 relative to the second support portion 102 and may be bendable at the second hinge portion 152 together with rotation of the third support portion 103 relative to the second support portion 102.

The hinge controllers 171 and 172 may control rotation of the first hinge portion 151 and the second hinge portion 152 based on an angle (hereinafter, "first angle") between the second support portion 102 and the first support portion 101 and an angle (hereinafter, "second angle") between the second support portion 102 and the third support portion 103. In specific, the hinge controllers 171 and 172 may control whether each of the first hinge portion 151 and the second hinge portion 152 is rotatable or unrotatable based on the first angle together with the second angle.

The hinge controllers 171 and 172 may be disposed at the back surface 112 of the panel support portion 100, as illustrated in FIGS. 2 and 3. In such an embodiment, the hinge controllers 171 and 172 may be disposed at an edge of the back surface 112 of the panel support portion 100.

The hinge controllers 171 and 172 may include a first hinge controller 171 and a second hinge controller 172. The first hinge controller 171 and the second hinge controller 172 may be disposed at opposite edges of the panel support portion 100 that face each other, respectively, along the Y-axis direction. In an embodiment, for example, the first hinge controller 171 may be disposed at an edge (hereinafter, "first edge") among edges of the panel support portion 100 that corresponds to a first end of a rotary shaft of the first hinge portion 151, and the second hinge controller 172 may be disposed at an edge (hereinafter, "second edge") of the edges of the panel support portion 100 that corresponds to a second end of the rotary shaft of the first hinge portion 151 which is opposite to the first end thereof.

As illustrated in FIG. 2, the first hinge controller 171 may be disposed at the first edge of the panel support portion 100 so as to be closer to the first support portion 101 than the third support portion 103 along the X-axis direction, and the second hinge controller 172 may be disposed at the second edge of the panel support portion 100 so as to be closer to the third support portion 103 than the first support portion 101 along the X-axis direction. In another embodiment, however, taken along the X-axis direction, the first hinge controller 171 may be disposed at the first edge of the panel support portion 100 so as to be closer to the third support portion 103 than the third support portion 103, and the second hinge controller 172 may be disposed at the second edge of the panel support portion 100 so as to be closer to the first support portion 101 than the third support portion 103.

The first hinge controller 171 may include a first spring 201, a first wire 211, and a first stopper 561 (in FIG. 7) disposed at the first hinge portion 151.

A first end of the first spring 201 is secured to the first support portion 101.

A first end of the first wire 211 is connected to a second end of the first spring 201 which is opposite to the first end thereof, and a second end of the first wire 211 which is opposite to the first end thereof is secured to the third support portion 103. The first wire 211 passes through a through hole of the first hinge portion 151, a through hole of the first stopper 561, a through hole of the second hinge portion 152, and a through hole of a first guide portion 291. The first wire 211 may include a metal material that is bendable. In such an embodiment, the first guide portion 291 protrudes from a back surface of the third support portion 103 in a direction opposite to the Z-axis direction (hereinafter, "−Z-axis direction").

The second hinge controller 172 may include a second spring 202, a second wire 212, and a second stopper 562 (in FIG. 14) disposed at the second hinge portion 152. The second stopper 562 may be unitarily formed with the second wire 212. The second stopper 562 may be movable along the second edge of the display device 1000 together with the second wire 212.

A first end of the second spring 202 is secured to the third support portion 103.

A first end of the second wire 212 is connected to a second end of the second spring 202 which is opposite to the first end thereof, and a second end of the second wire 212 which is opposite to the first end thereof is secured to the first support portion 101. The second wire 212 passes through a through hole of the second hinge portion 152, a through hole of the first hinge portion 151, and a through hole of a second guide portion 292. The second wire 212 may include a metal material that is bendable. In such an embodiment, the second guide portion 292 protrudes from a back surface 112 of the first support portion 101 in the direction opposite to the Z-axis direction (hereinafter, "−Z-axis direction").

Figure 4:
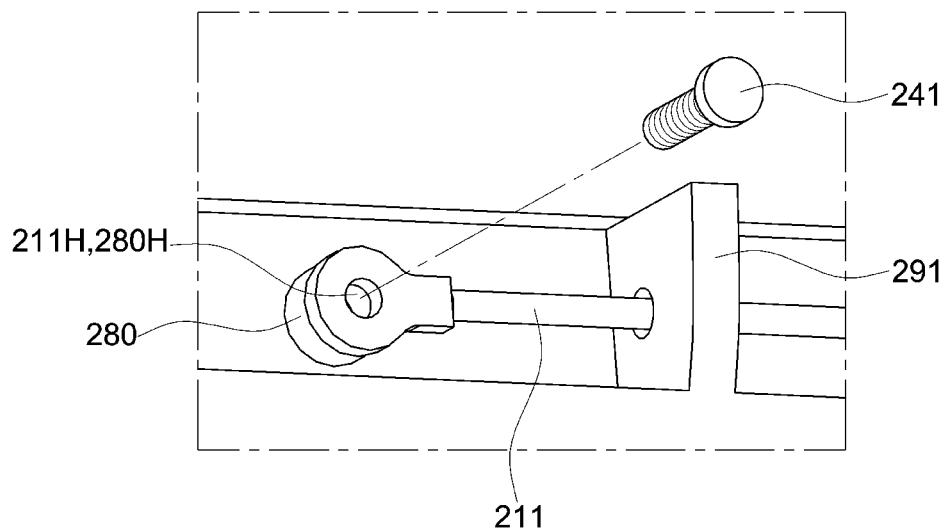
FIG. 4 is an explanatory view illustrating an embodiment of a coupling relationship between a first wire and a third support portion of FIG. 1.

FIG. 4 is an explanatory view illustrating an embodiment of a coupling relationship between the first wire 211 and the third support portion 103 of FIG. 1.

As illustrated in FIG. 4, the second end of the first wire 211 may be secured to a securing portion of the third support portion 103 through a first screw 241. The first screw 241 may pass through a coupling hole 211H defined at the second end of the first wire 211 to be coupled to a coupling depression 280H of a securing portion 280 of the third support portion 103. The coupling hole 211H and the coupling depression 280H may be aligned with each other. A thread corresponding to a thread of the first screw 241 may be disposed at an inner wall of the coupling hole 211H of the second end of the first wire 211 and an inner wall of the coupling depression 280H of the securing portion 280.

Figure 5:
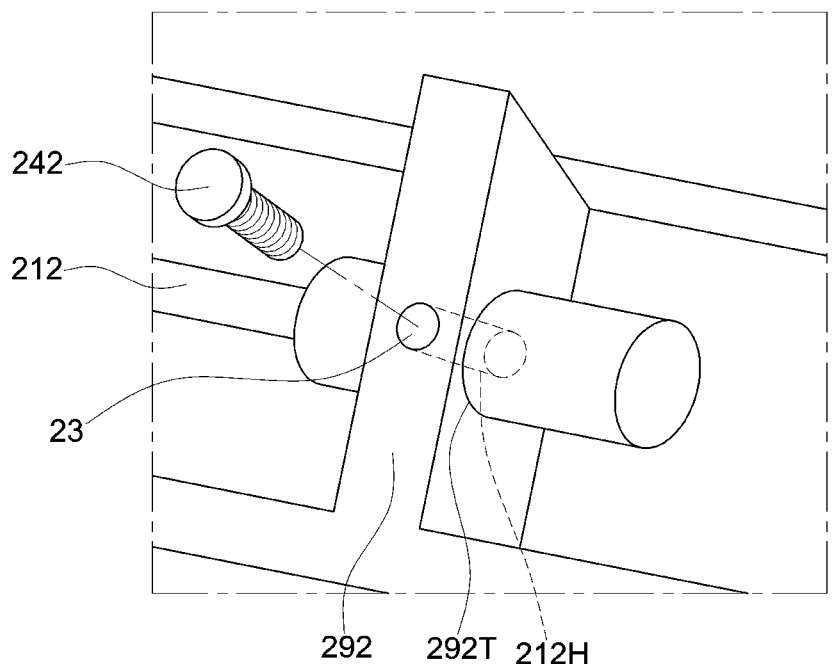
FIG. 5 is an explanatory view illustrating an embodiment of a coupling relationship between a second wire and a first support portion of FIG. 1.

FIG. 5 is an explanatory view illustrating an embodiment of a coupling relationship between the second wire 212 and the first support portion 101 of FIG. 1.

The second end of the second wire 212 may have a dimension (e.g., diameter) greater than a dimension (e.g., diameter) of a remaining portion of the second wire 212. In such an embodiment, the second end of the second wire 212 may have a coupling hole 212H that is defined through a thickness of the second wire 212. In addition, the second guide portion 292 may have a coupling hole 292H that is defined through the second guide portion 292 in a vertical direction (for example, the Z-axis direction). The coupling hole 292H of the second guide portion 292 is connected to (e.g., is in communication with) a through hole 292T of the second guide portion 292 that is defined along a horizontal direction (for example, the X-axis direction). Accordingly, the coupling hole 212H at the second end of the second wire 212 which is located in the through hole 292T of the second guide portion 292, is arranged corresponding to the coupling hole 292H of the second guide portion 292.

The second screw 242 may be coupled to the coupling hole 212H of the second wire 212 through the coupling hole 292H of the second guide portion 292.

At a coupling of a second end of a wire to a particular support portion, the structure of FIG. 4 or FIG. 5 may be used. In an embodiment, the second end of the first wire 211 and the first guide portion 291 may have a structure as illustrated in FIG. 5. In addition, the second end of the second wire 212 and the second guide portion 292 may have a structure as illustrated in FIG. 4. In such an embodiment, the securing portion 280 as illustrated in FIG. 4 may be further disposed at the second end of the second wire 212.

Figure 6:
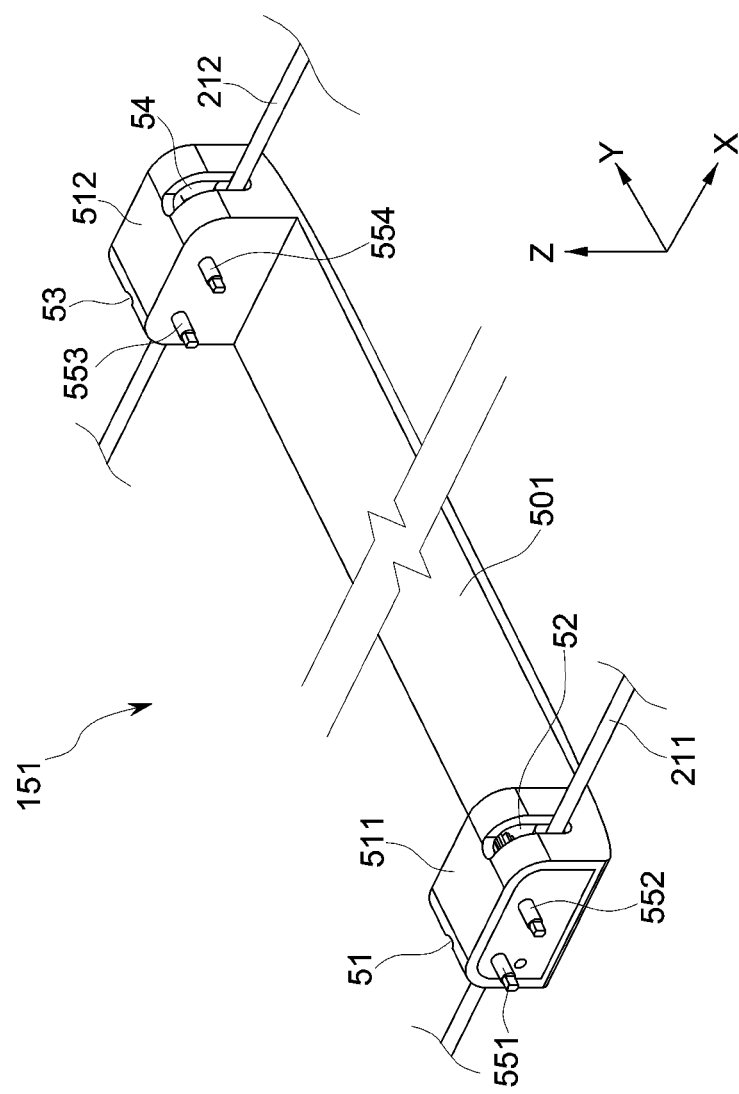
FIG. 6 is a perspective view illustrating an embodiment of a first hinge portion of FIG. 1.
Figure 7:
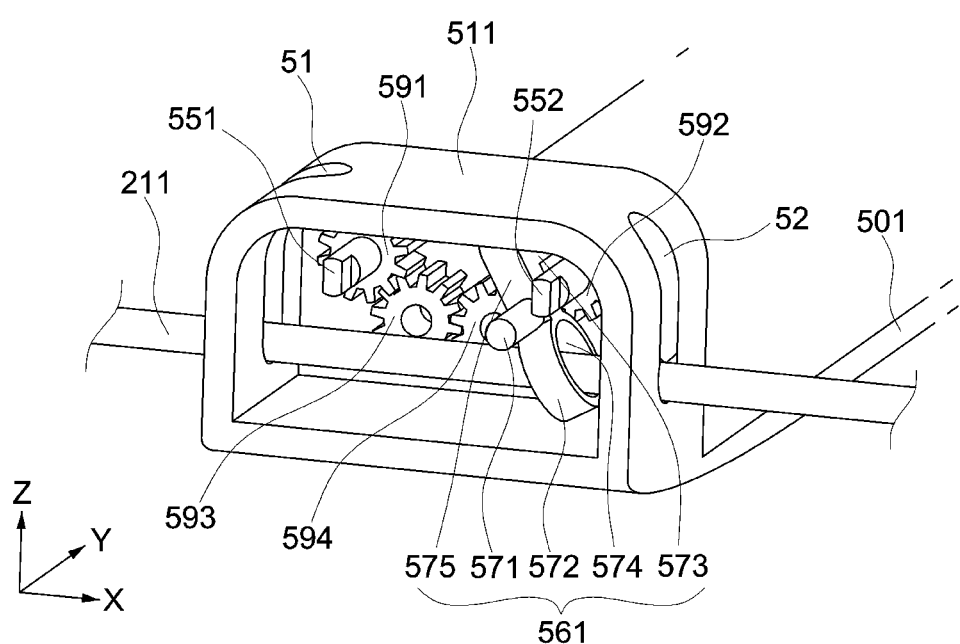
FIG. 7 is an embodiment of a detailed configuration view illustrating the first hinge portion of FIG. 6.
Figure 8:
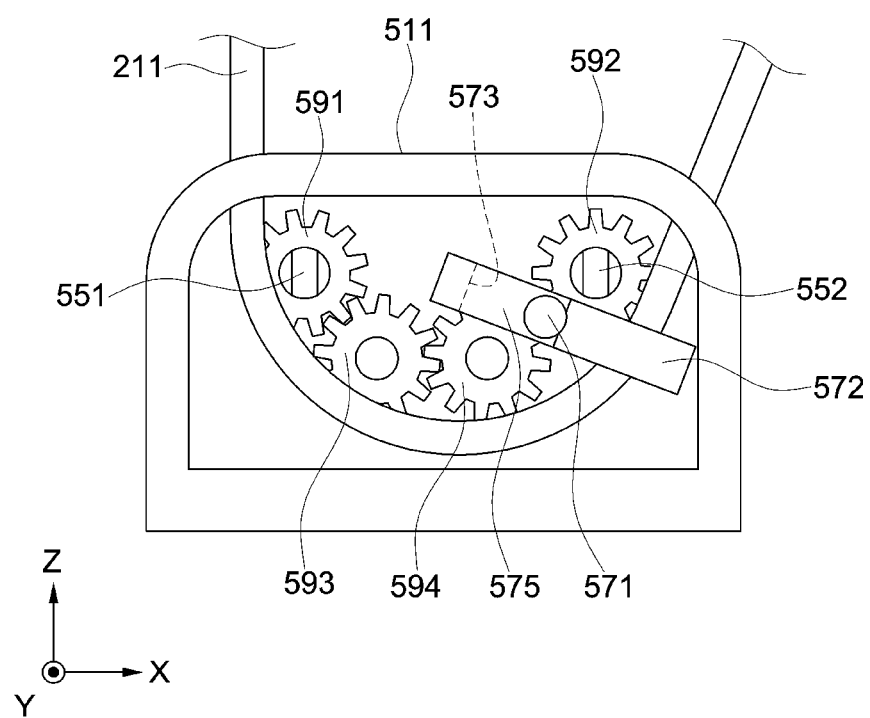
FIG. 8 is an explanatory view illustrating an embodiment of an operation of disabling rotation of the first hinge portion by a first stopper of FIG. 7.
Figure 9:
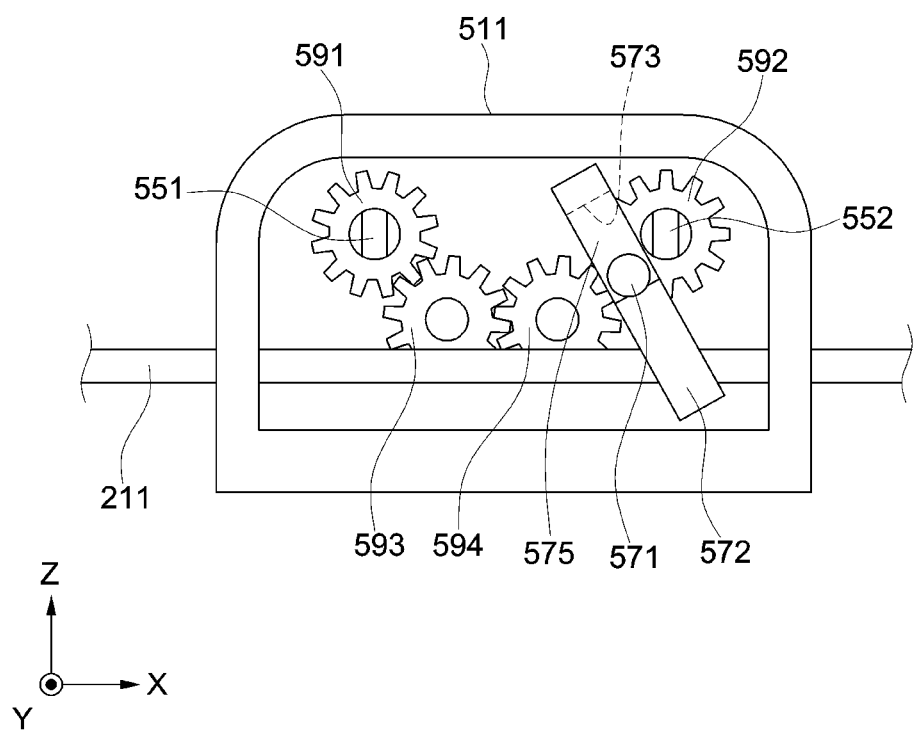
FIG. 9 is an explanatory view illustrating an embodiment of an operation of enabling rotation of the first hinge portion by the first stopper of FIG. 7.

FIG. 6 is a perspective view illustrating an embodiment of the first hinge portion 151 of FIG. 1 from the rear view, FIG. 7 is an embodiment of a detailed configuration view illustrating the first hinge portion 151 of FIG. 6, FIG. 8 is an explanatory view illustrating an embodiment of an operation of disabling rotation of the first hinge portion 151 by a first stopper 561 of FIG. 7, and FIG. 9 is an explanatory view illustrating an embodiment of an operation of enabling rotation of the first hinge portion 151 by the first stopper 561 of FIG. 7.

As illustrated in FIG. 6, the first hinge portion 151 may include a first plate 501, a first coupling portion 511, and a second coupling portion 512.

The first coupling portion 511 may protrude in the Z-axis direction from a first end of the first plate 501. The first support portion 101 and the second support portion 102 described above may be rotatably connected to the first coupling portion 511. In an embodiment, for example, the first connection portion 11 of the first support portion 101 and the first connection portion 21 of the second support portion 102 may each be rotatably connected to the first coupling portion 511.

The first coupling portion 511 may include a first rotary shaft 551 and a second rotary shaft 552. The first rotary shaft 551 and the second rotary shaft 552 extend along a Y-axis direction. The first rotary shaft 551 and the second rotary shaft 552 are exposed to the outside of the first coupling portion 511 through holes of the first coupling portion 511, respectively. In such an embodiment, the first rotary shaft 551 and the second rotary shaft 552 are exposed to the outside at opposite surfaces of the first coupling portion 511 that face each other in the Y-axis direction.

The first rotary shaft 551 is connected to the first connection portion 11 of the first support portion 101. In an embodiment, for example, the first rotary shaft 551 may be insertable into a coupling hole of the first connection portion 11 of the first support portion 101. A distal end of the first rotary shaft 551 and the coupling hole of the first connection portion 11 at which the distal end of the first rotary shaft 551 is connected, may each have a quadrangular shape in cross-section.

The second rotary shaft 552 is connected to the first connection portion 21 of the second support portion 102. In an embodiment, for example, the second rotary shaft 552 may be insertable into a coupling hole of the first connection portion 21 of the second support portion 102. A distal end of the second rotary shaft 552 and the coupling hole of the first connection portion 21 at which the distal end of the second rotary shaft 552 is connected, may each have a quadrangular shape in cross-section.

In an embodiment, the first wire 211 of the first hinge controller 171 passes through a first through hole 51 and a second through hole 52 of the first coupling portion 511. The first through hole 51 and the second through hole 52 are connected to (e.g., are in communication with) each other along the X-axis direction. In an embodiment, for example, the first through hole 51 and the second through hole 52 together define one hole that is defined through opposing side surfaces of the first coupling portion 511 in the X-axis direction.

The first coupling portion 511 may include a first gear 591, a second gear 592, a third gear 593 and a fourth gear 594, as illustrated in FIG. 7. The first gear 591, the second gear 592, the third gear 593, and the fourth gear 594 may be disposed at a storage space provided inside the first coupling portion 511. The first gear 591 and the second gear 592 are disposed apart from each other at an upper side of the storage space, and the third gear 593 and the fourth gear 594 are disposed at a lower side of the storage space. In other words, the third gear 593 is disposed below the first gear 591, and the fourth gear 594 is disposed below the second gear 592.

A shaft of the first gear 591 may be connected to the first rotary shaft 551 described above, and a shaft of the second gear 592 may be connected to the second rotary shaft 552 described above. In an embodiment, for example, the shaft of the first gear 591 may be unitarily formed with the first rotary shaft 551, and the shaft of the second gear 592 may be unitarily formed with the second rotary shaft 552. The second gear 592 is connected to the fourth gear 594, the fourth gear 594 is connected to the third gear 593, and the third gear 593 is connected to the first gear 591. In an embodiment, each of a shaft of the third gear 593 and a shaft of the fourth gear 594 are rotatably coupled to the first coupling portion 511.

When the first gear 591 rotates, the third gear 593 connected to the first gear 591 rotates; when the third gear 593 rotates, the fourth gear 594 connected to the third gear 593 rotates; and when the fourth gear 594 rotates, the second gear 592 connected to the fourth gear 594 rotates. When a rotation force is applied one of the gears, the first gear 591 and the fourth gear 594 rotate in a substantially same direction, and the second gear 592 and the third gear 593 rotate in a substantially same direction. The first gear 591 and the second gear 592 rotate in opposite directions, and the third gear 593 and the fourth gear 594 rotate in opposite directions.

In an embodiment, the first stopper 561 of the first hinge controller 171 is disposed at the storage space of the first coupling portion 511 described above. The first stopper 561 is rotatably coupled to the first coupling portion 511.

The first stopper 561 includes a body portion 575, a rotary shaft 571, a securing portion 573, and a support portion 572. The rotary shaft 571 protrudes from the body portion 575 and is insertable into a hole of the first coupling portion 511. The support portion 572 protrudes from a first end of the body portion 575. The support portion 572 has a support hole 574 defined through the support portion 572. The securing portion 573 protrudes from a second end of the body portion 575. The rotary shaft 571 and the securing portion 573 may protrude in opposite directions. In an embodiment, for example, the rotary shaft 571 may protrude from the body portion 575 in a direction opposite to the Y-axis direction (hereinafter, "−Y-axis direction), and the securing portion 573 may protrude from the body portion 575 in the Y-axis direction. The securing portion 573 may be disposed between the first gear 591 and the second gear 592. The first stopper 561 may rotate clockwise or counterclockwise about the rotary shaft 571 extended along the Y-axis direction in accordance with a moving direction of the first wire 211.

The first wire 211 of the first hinge controller 171 is extended through the first through hole 51 of the first coupling portion 511, the support hole 574 of the first stopper 561, and the second through hole 52 of the first coupling portion 511.

A rotation direction of the first stopper 561 is controlled in accordance with the moving direction of the first wire 211. In an embodiment, for example, where the first wire 211 is translated along (or pulled in) a direction opposite to the X-axis direction (hereinafter, "−X-axis direction"), the first stopper 561 rotates clockwise about the rotary shaft 571. On the other hand, where the first wire 211 is translated along (or pulled in) the X-axis direction, the first stopper 561 rotates counterclockwise about the rotary shaft 571.

In an embodiment, as illustrated in FIG. 8, where the first stopper 561 rotates counterclockwise, the securing portion 573 of the first stopper 561 is inserted between teeth of the fourth gear 594, and thus rotation of the fourth gear 594 is substantially prevented. Accordingly, the first gear 591, the second gear 592, and the third gear 593 may not rotate either.

In other words, engagement of the securing portion 573 with the third gear 593 disposes the third gear 593 unrotatable which disposes the first hinge portion 151 unrotatable.

On the other hand, as illustrated in FIG. 9, where the first stopper 561 rotates clockwise, the securing portion 573 of the first stopper 561 is separated from the teeth of the fourth gear 594, and thus the first gear 591, the second gear 592, and the third gear 593 including the fourth gear 594 may be rotatable.

As illustrated in FIG. 6, the second coupling portion 512 may protrude in the Z-axis direction from a second end of the first plate 501 which is opposite to the first end thereof. The first support portion 101 and the second support portion 102 described above may be rotatably connected to the second coupling portion 512.

The second coupling portion 512 may include a third rotary shaft 553 and a fourth rotary shaft 554. The third rotary shaft 553 and the fourth rotary shaft 554 extend along the Y-axis direction. The third rotary shaft 553 and the fourth rotary shaft 554 are exposed to the outside of the second coupling portion 512 through holes of the second coupling portion 512, respectively. In such an embodiment, the third rotary shaft 553 and the fourth rotary shaft 554 are exposed to the outside through opposite surfaces of the second coupling portion 512 that oppose each other along the Y-axis direction.

The third rotary shaft 553 is connected to the second connection portion 12 of the first support portion 101. In an embodiment, for example, the third rotary shaft 553 may be insertable into a coupling hole of the second connection portion 12 of the first support portion 101. A distal end of the third rotary shaft 553 and the coupling hole of the second connection portion 12 to which the third rotary shaft 553 is connected may each have a quadrangular shape in cross-section.

The fourth rotary shaft 554 is connected to the second connection portion 22 of the second support portion 102. In an embodiment, for example, the fourth rotary shaft 554 may be insertable into a coupling hole of the second connection portion 22 of the second support portion 102. A distal end of the fourth rotary shaft 554 and the coupling hole of the second connection portion 22 to which the fourth rotary shaft 554 is connected may each have a quadrangular shape in cross-section.

In an embodiment, the second wire 212 of the second hinge controller 172 passes through a third through hole 53 and a fourth through hole 54 of the second coupling portion 512.

Although not illustrated, the second coupling portion 512 may include the first, second, third, and fourth gears 591, 592, 593, and 594 described above. The shaft of the first gear 591 included in the second coupling portion 512 may be connected to the third rotary shaft 553, and the shaft of the second gear 592 included in the second coupling portion 512 may be connected to the fourth rotary shaft 554. In an embodiment, the second coupling portion 512 does not include the first stopper 561 described above. In other words, the first stopper 561 is selectively included only in one of the first coupling portion 511 among the first coupling portion 511 and the second coupling portion 512. Accordingly, the second wire 212 of the second hinge controller 172 passes through the third through hole 53 and the fourth through hole 54 of the second coupling portion 512, and may not contribute to the making the first hinge portion 151 unrotatable.

Figure 10:
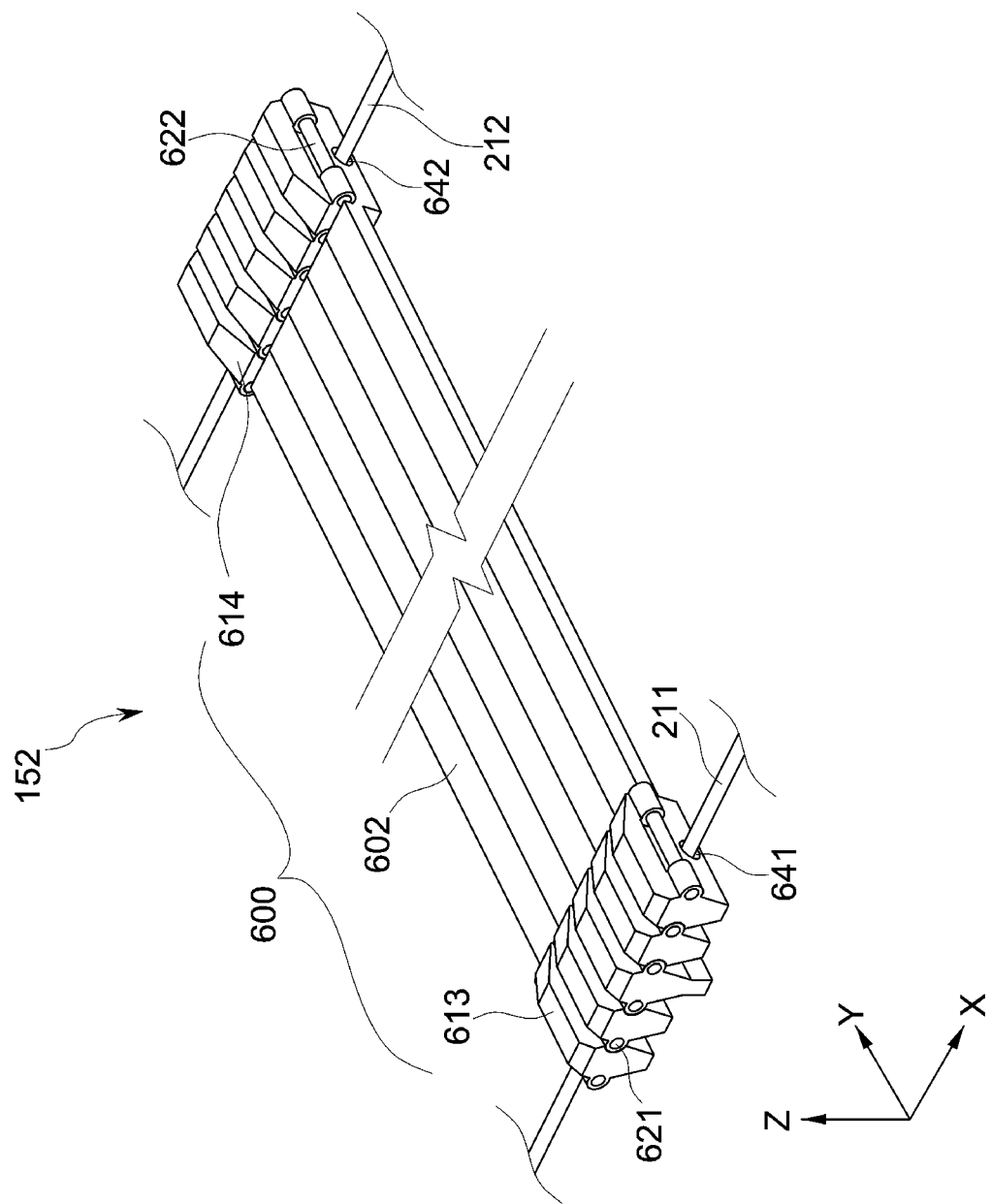
FIG. 10 is a perspective view illustrating an embodiment of a second hinge portion of FIG. 1.
Figure 11:
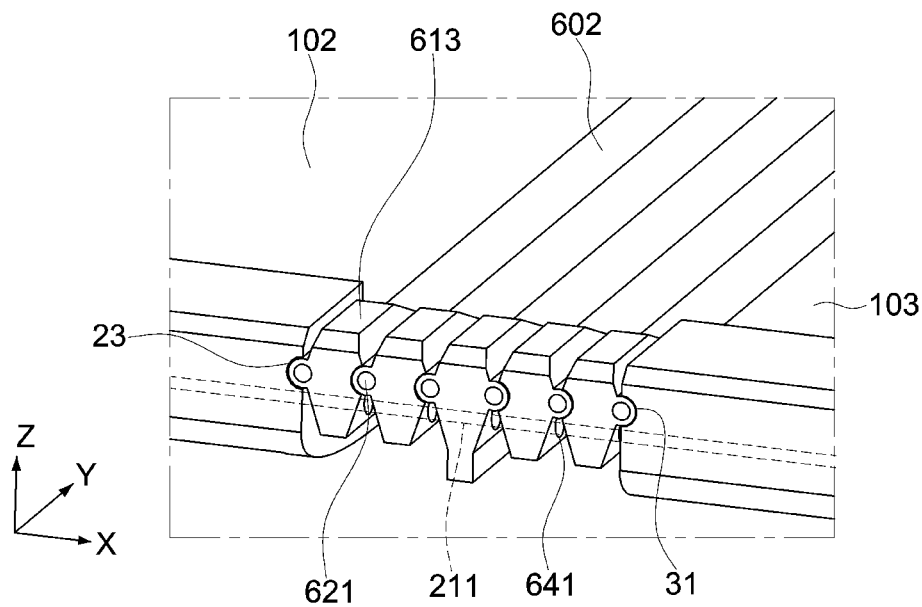
FIG. 11 is a view illustrating an embodiment of a coupling relationship between a second hinge portion and support portions of FIG. 10.
Figure 12:
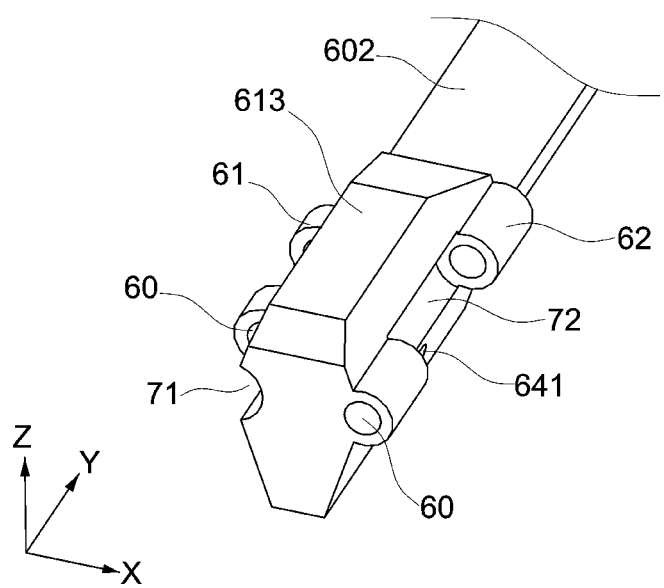
FIG. 12 is a perspective view illustrating an embodiment of one joint portion of FIG. 10.
Figure 13:
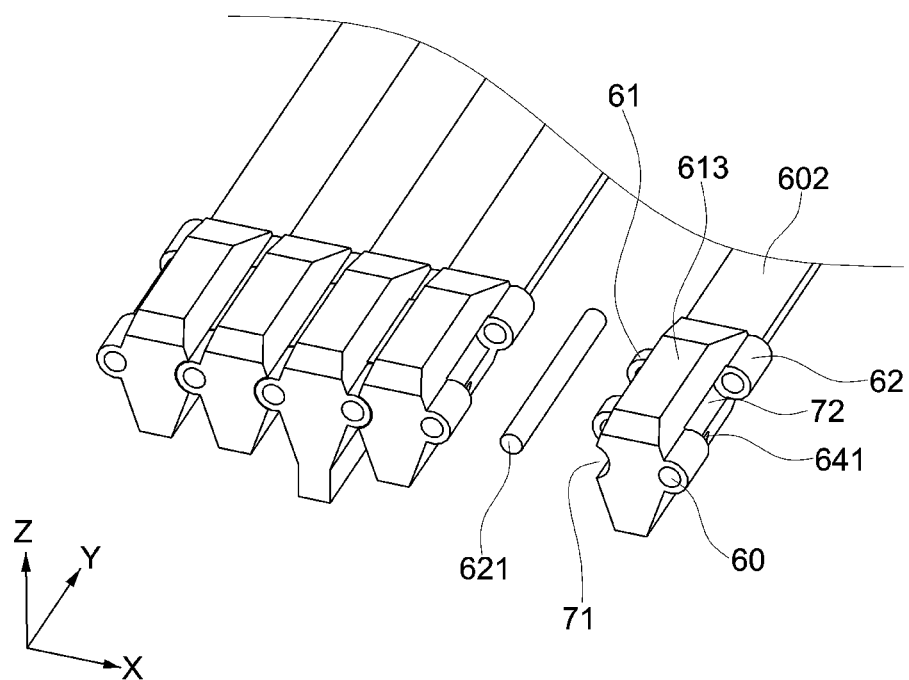
FIG. 13 is an explanatory view illustrating an embodiment of a connection relationship between joint portions and a connection shaft of FIG. 10.

FIG. 10 is a perspective view illustrating an embodiment of the second hinge portion 152 of FIG. 1, FIG. 11 is a view illustrating an embodiment of a coupling relationship between the second hinge portion 152 and the support portions of FIG. 10, FIG. 12 is a perspective view illustrating an embodiment of one joint portion 600 of FIG. 10, and FIG. 13 is an explanatory view illustrating an embodiment of a connection relationship between the joint portions 600 of FIG. 10 and a connection shaft.

As illustrated in FIGS. 10 to 13, the second hinge portion 152 may include a joint 600 provided in plurality, a first connection shaft 621 provided in plurality and a second connection shaft 622 provided in plurality, which are otherwise respectively referred to as a plurality of joints 600, a plurality of first connection shafts 621, and a plurality of second connection shafts 622.

Each of the joints 600 may include a second plate 602, a third coupling portion 613, and a fourth coupling portion 614.

The third coupling portion 613 is connected to a first end of the second plate 602, and the fourth coupling portion 614 is connected to a second end of the second plate 602. The second plate 602, the third coupling portion 613, and the fourth coupling portion 614 included in one joint portion 600 may be formed unitarily.

Adjacent ones of the third coupling portions 613 are hingedly coupled to each other through the first connection shaft 621. Each of the plurality of third coupling portions 613 may have a rhombic cross-section.

As illustrated in FIG. 12, at least one first projection 61 and at least one first depression 71 are alternately arranged on a first side surface of each of the third coupling portions 613, and at least one second projection 62 and at least one second depression 72 are alternately arranged on a second side surface of each of the third coupling portions 613 which is opposite to the first side surface thereof. In such an embodiment, along the X-axis direction, the second depression 72 is located at a position corresponding to the first projection 61, and the second projection 62 is located at a position corresponding to the first depression 71.

The first projection 61 and the second projection 62 have through holes 60 respectively defined through center portions thereof. The through holes 60 are open along the Y-axis direction.

Each of the first projection 61 and the second projection 62 has a protruding cylindrical shape, and the first depression 71 and the second depression 72 have a concave shape.

The first projection 61 provided at one facing surfaces among two facing surfaces of two adjacent third coupling portions 613, faces the second depression 72 provided at the other facing surface among the two facing surfaces of the two adjacent third coupling portions 613. The first projection 61 at the one facing surface is insertable into the second depression 72 at the other facing surface. With the projections and the depressions of the two adjacent ones of the third coupling portions 613 being coupled to each other, the through holes 60, the first depressions 71 and the second depressions 72 are aligned with each other along the Y-axis direction, such that the first connection shaft 621 is insertable into the through holes 60 of the projections for each of the first projections 61 and the second projections 62. In such a manner, adjacent ones of the third coupling portions 613 may be coupled to each other in a hinge manner.

In an embodiment, as illustrated in FIG. 11, a first outermost one of the plurality of third coupling portions 613 is connected to the third connection portion 23 of the second support portion 102 through the first connection shaft 621, and another of the plurality of third coupling portions 613 that is disposed at a second outermost one of the plurality of third coupling portions 613 which is opposite to the first outermost one is connected to the first connection portion 31 of the third support portion 103 through the first connection shaft 621. In such an embodiment, the first outermost one of the plurality of third coupling portions 613 is disposed closest to the second support portion 102, and the second outermost one of the plurality of third coupling portions 613 is disposed closest to the third support portion 103.

Each of the third coupling portions 613 has a through hole 641. The through hole 641 passes through opposing side surfaces of the third coupling portion 613 to be open along the X-axis direction.

When the second support portion 102 and the third support portion 103 form an angle of about 180 degrees, the through holes 641 of the third coupling portions 613 face each other to be aligned with each other. The first wire 211 is insertable into the through holes 641 of the third coupling portions 613 which are aligned with each other. A dimension or size of the through hole 641 of the third coupling portion 613 may be greater than a diameter of the first wire 211.

As illustrated in FIG. 10, adjacent ones of the fourth coupling portions 614 are hingedly coupled to each other through the second connection shaft 622. Each of the plurality of fourth coupling portions 614 may have a rhombic cross-section.

The fourth coupling portion 614 may include the first projection 61, the second projection 62, the first depression 71, and the second depression 72 described above. Specifically, at least one first projection 61 and at least one first depression 71 are alternately arranged along a first side surface of each of the fourth coupling portions 614, and at least one second projection 62 and at least one second depression 72 are alternately arranged along a second side surface of each of the fourth coupling portions 614 which is opposite to the first side surface thereof. In such an embodiment, along the X-axis direction, the second depression 72 is located at a position corresponding to the first projection 61, and the second projection 62 is located at a position corresponding to the first depression 71.

For each of the fourth coupling portions 614, the first projection 61 and the second projection 62 have through holes 60 respectively defined through center portions thereof.

For each of the fourth coupling portions 614, each of the first projection 61 and the second projection 62 has a protruding cylindrical shape, and the first depression 71 and the second depression 72 have a concave shape.

The first projection 61 provided at one facing surface among two facing surfaces of two adjacent fourth coupling portions 614 faces the second depression 72 provided at the other facing surface among the two facing surfaces of the two adjacent fourth coupling portions 614. The first projection 61 is insertable into the second depression 72. With the projections and the depressions of adjacent ones of the fourth coupling portions 614 are coupled to each other to be aligned with each other, the second connection shaft 622 is insertable into the through holes 60 of the projections. In such a manner, adjacent ones of the fourth coupling portions 614 may be coupled to each other in a hinge manner.

In an embodiment, as illustrated in FIG. 10, a first outermost one of the plurality of fourth coupling portions 614 is connected to the fourth connection portion 24 of the second support portion 102 through the second connection shaft 622, and a second outermost one of the plurality of fourth coupling portions 614 is connected to the second connection portion 32 of the third support portion 103 through the second connection shaft 622. In such an embodiment, the first outermost one of the plurality of fourth coupling portions 614 is disposed closest to the second support portion 102, and the second outermost one of the plurality of fourth coupling portions 614 is disposed closest to the third support portion 103.

Each of the fourth coupling portions 614 has a through hole 642 open along the X-axis direction. When the second support portion 102 and the third support portion 103 form an angle of about 180 degrees, the through holes 642 of the fourth coupling portions 614 face each other such as to be aligned with each other. The second wire 212 extends through the through holes 642 of the fourth coupling portions 614. A size of the through hole 642 of the fourth coupling portion 614 may be greater than a diameter of the second wire 212.

In an embodiment, the plurality of second stoppers 562 may be disposed at an outer circumferential surface of the second wire 212 along the second wire 212, which will be described in detail with reference to FIGS. 14 to 18. In an embodiment, the second stoppers 562 may be selectively included only in one of the first coupling portion 511 among the third coupling portions 613 and the fourth coupling portions 614. Accordingly, the other one among the third coupling portions 613 and the fourth coupling portions 614 may not contribute to the making the second hinge portion 152 unrotatable.

Figure 14:
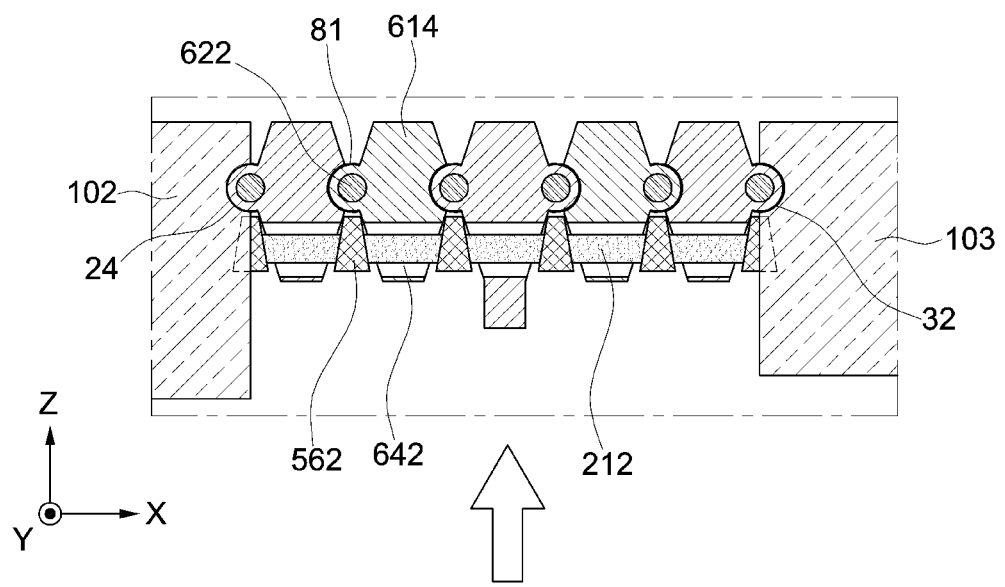
FIG. 14 is a cross-sectional view illustrating an embodiment of fourth coupling portions, a second connection shaft, a second wire, and an exposed second stopper of FIG. 10.
Figure 15:
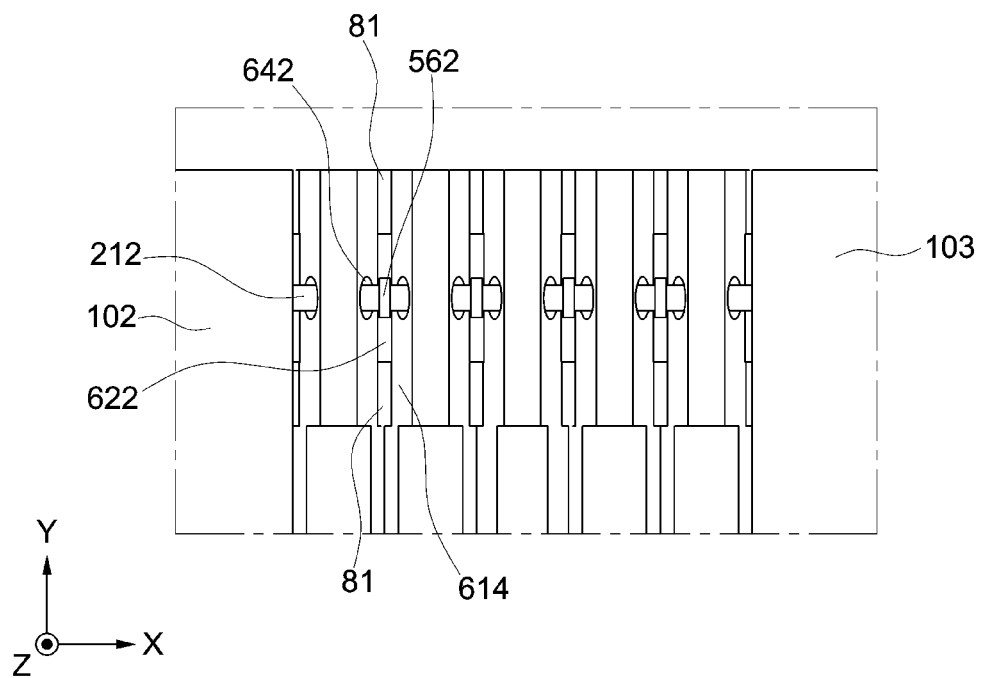
FIG. 15 is a view illustrating the structure of FIG. 14 viewed in a direction of the arrow in FIG. 14.
Figure 16:
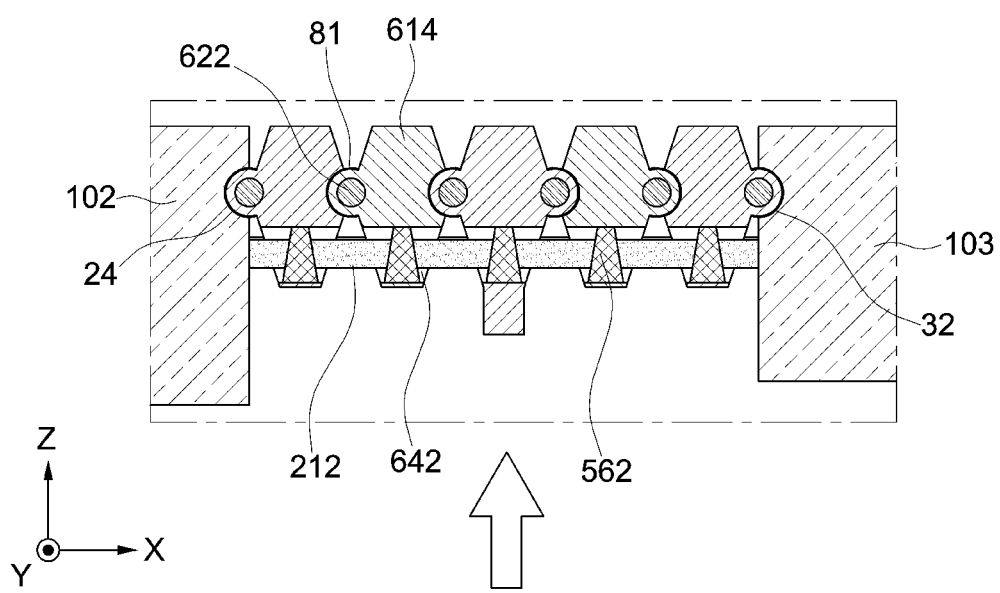
FIG. 16 is a cross-sectional view illustrating an embodiment of fourth coupling portions, a second connection shaft, a second wire, and a non-exposed second stopper of FIG. 10.
Figure 17:
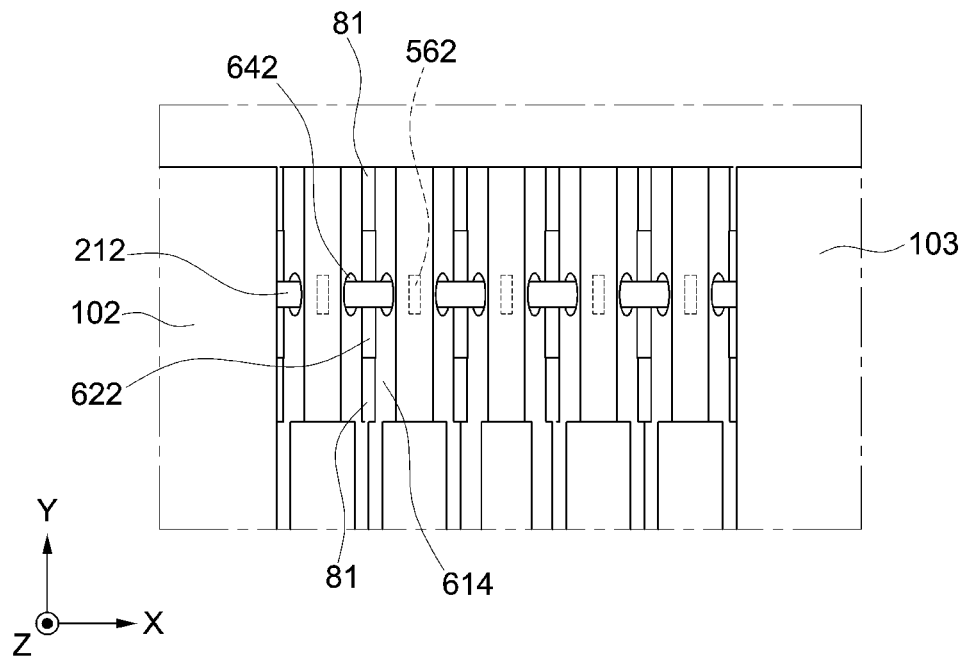
FIG. 17 is a view illustrating the structure of FIG. 16 viewed in a direction of the arrow in FIG. 16.
Figure 18:
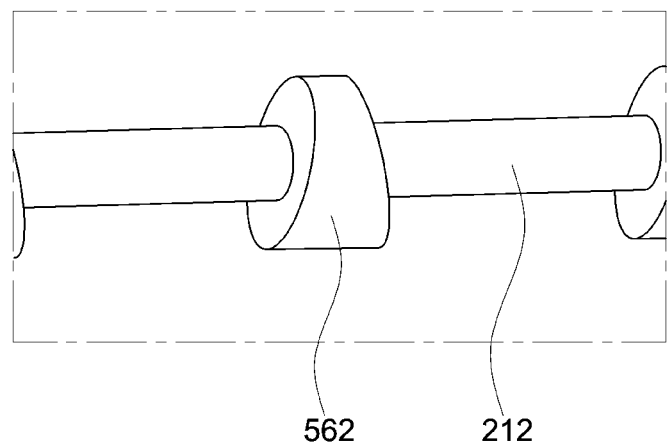
FIG. 18 is a perspective view illustrating an embodiment of a second wire and second stoppers of FIGS. 14 to 17.

FIG. 14 is a cross-sectional view illustrating an embodiment of the fourth coupling portions 614, the second connection shaft 622, the second wire 212, and an exposed form of the second stopper 562 of FIG. 10, FIG. 15 is a view illustrating the structure of FIG. 14 viewed in a direction of the upward arrow in FIG. 14, FIG. 16 is a cross-sectional view illustrating an embodiment of the fourth coupling portions 614, the second connection shaft 622, the second wire 212, and a non-exposed form of the second stopper 562 of FIG. 10, FIG. 17 is a view illustrating the structure of FIG. 16 viewed in a direction of the upward arrow in FIG. 16, and FIG. 18 is a perspective view illustrating an embodiment of the second wire 212 and the second stoppers 562 of FIGS. 14 to 17.

As illustrated in FIGS. 14 to 17, the second wire 212 extends through the through holes 642 of the fourth coupling portions 614. A size (or diameter) of each of the through holes 642 is greater than a diameter of the second wire 212.

As described above, the fourth coupling portions 614 may be hingedly coupled to each other by the second connection shafts 622. In such an embodiment, the second connection shafts 622 may include a material having magnetic properties. The fourth coupling portion 614 may have a structure substantially the same as a structure of the third coupling portion 613 described above.

The second stoppers 562 may protrude from the second wire 212. In an embodiment, for example, the second stoppers 562 may surround the outer circumferential surface of the second wire 212. The second stoppers 562 may be disposed at regular intervals along a length of the second wire 212 (e.g., along the X-axis direction). The second stoppers 562 and the second wires 212 may be unitarily formed. Each of the second stoppers 562 may include a metal material. A size (or diameter) of each of the through holes 642 of the fourth coupling portions 614 may be substantially equal to or greater than a size of each of the second stoppers 562 such that the second stoppers 562 may pass through the through holes 642.

As illustrated in FIGS. 14 and 15, the second stoppers 562 may be disposed between adjacent ones of the fourth coupling portions 614 in accordance with a moving direction of the second wire 212. The second stoppers 562 disposed between adjacent ones of the fourth coupling portions 614 are exposed to a rear side of the second hinge portion 152. In such an embodiment, each of the second stoppers 562 may be disposed below each of the second connection shafts 622 to respective correspond thereto. In such an embodiment, each of the second stoppers 562 may be disposed below a portion of each of the second connection shafts 622 that is exposed to the outside. Accordingly, the second stoppers 562 move toward the second connection shafts 622 (e.g., in the Z-axis direction) by the magnetism of the second connection shaft 622 relative to the second stoppers 562. The second stoppers 562 are attachable to the second connection shafts 622 at portions thereof that are exposed to the outside the due to the magnetism. That is, magnetic attraction between the second connection shaft 622 and the second stopper 562 biases the second stopper 562 toward an area between adjacent fourth coupling portions 614.

In such an embodiment, by movement of the second stoppers 562 toward the second connection shafts 622 by the magnetism, the second wire 212 connected to the second stoppers 562 also moves in the Z-axis direction toward an upper inner wall of the through holes 642 of the fourth coupling portions 614. In an embodiment, as the second stoppers 562 move toward the second connection shaft 622, upper edges of the second stoppers 562 are disposed not to face the through holes 642 of the fourth coupling portions 614. As shown in FIG. 14, the upper edges of the second stoppers 562 are disposed between side surfaces of adjacent ones of the fourth coupling portions 614 and the second stoppers 562 are restricted from being disposed in the through holes 642. Where the second stoppers 562 are disposed between side surfaces of adjacent ones of the fourth coupling portions 614, adjacent fourth coupling portions 614 may not move toward each other. Accordingly, rotation of the fourth coupling portions 614 may be substantially prevented. Referring to FIG. 14, rotation of the fourth coupling portions 614 in a clockwise direction relative to a rotation axis along the Y-axis direction, is substantially prevented.

In an embodiment, as illustrated in FIGS. 16 and 17, the second stoppers 562 may be disposed in the through holes 642 of the fourth coupling portions 614 in accordance with the moving direction of the second wire 212. The second stoppers 562 disposed in the through holes 642 of the fourth coupling portions 614 are non-exposed to a rear side of the second hinge portion 152. In such an embodiment, the fourth coupling portions 614 may rotate. Referring to FIG. 16, with the second stoppers 562 being disposed in the through holes 642 of the fourth coupling portions 614, the fourth coupling portions 614 are free to rotate in the clockwise direction relative to a rotation axis along the Y-axis direction.

Referring to FIGS. 14 to 17, disposing of the second stopper 562 between the adjacent fourth coupling portions 614 disposes the second hinge portion 152 unrotatable, and disposing of the second stopper 562 within a fourth coupling portion 614 among the adjacent fourth coupling portions 614 disposes the second hinge portion 152 rotatable.

In FIGS. 14 to 17, a projection 81 is disposed at a side surface of the fourth coupling portion 614, and a depression 91 (in FIG. 21) is disposed at a same side surface of the fourth coupling portion 614 as the projection 81.

As illustrated in FIG. 18, an outer side surface of the second stopper 562 may have a round shape.

Figure 19:
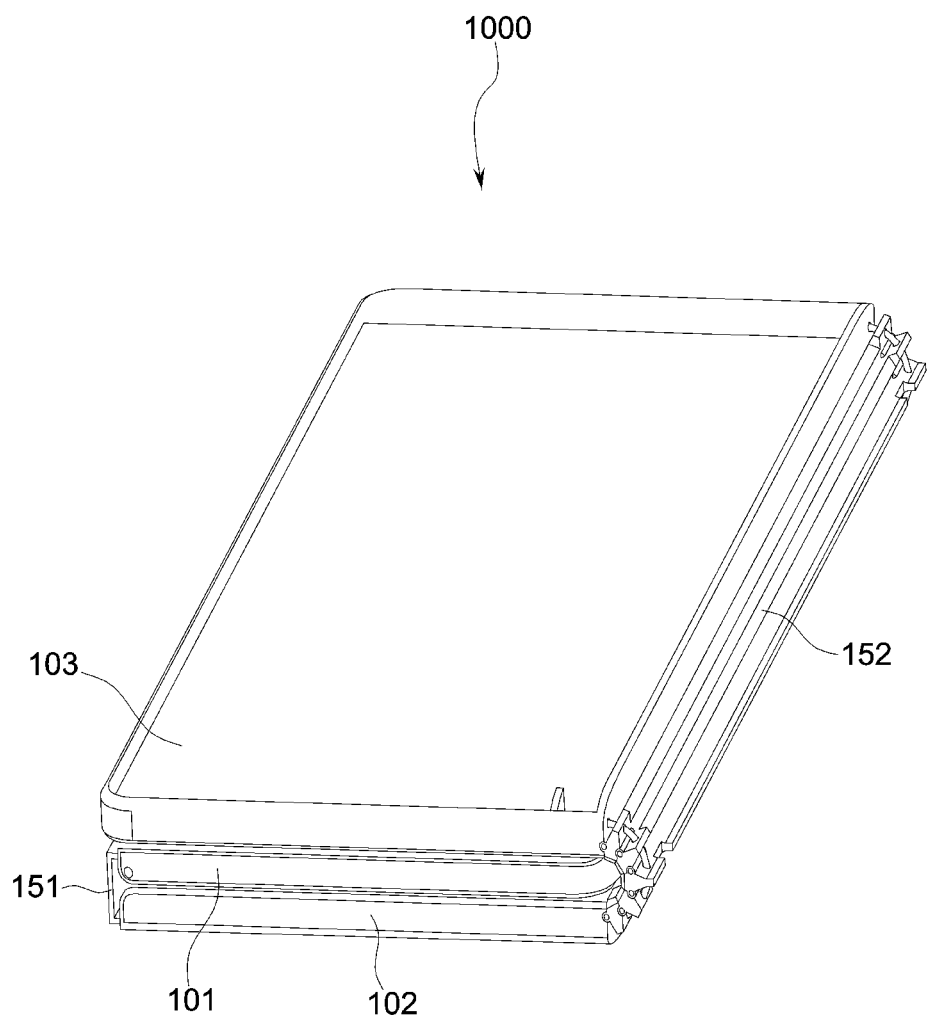
FIG. 19 is a view illustrating an embodiment of a structure of a display device of FIG. 1 which is folded in a G-shape.

FIG. 19 is a view illustrating an embodiment of a structure of the display device 1000 of FIG. 1 which is folded in a G-shape. With reference to a rotation axis extended along the Y-axis direction of FIG. 1, the first support portion 101 is rotated clockwise and the third support portion 103 is rotated in a counterclockwise direction.

As illustrated in FIG. 19, in the display device 1000 that is folded in a G-shape, the first support portion 101 is disposed on the second support portion 102, and the third support portion 103 is disposed on the first support portion 101. In other words, the first support portion 101 is disposed between the second support portion 102 and the third support portion 103 along the Z-axis direction. In such an embodiment, the first angle between the second support portion 102 and the first support portion 101 is substantially zero degree, and the second angle between the second support portion 102 and the third support portion 103 is substantially zero degree.

Figure 20:
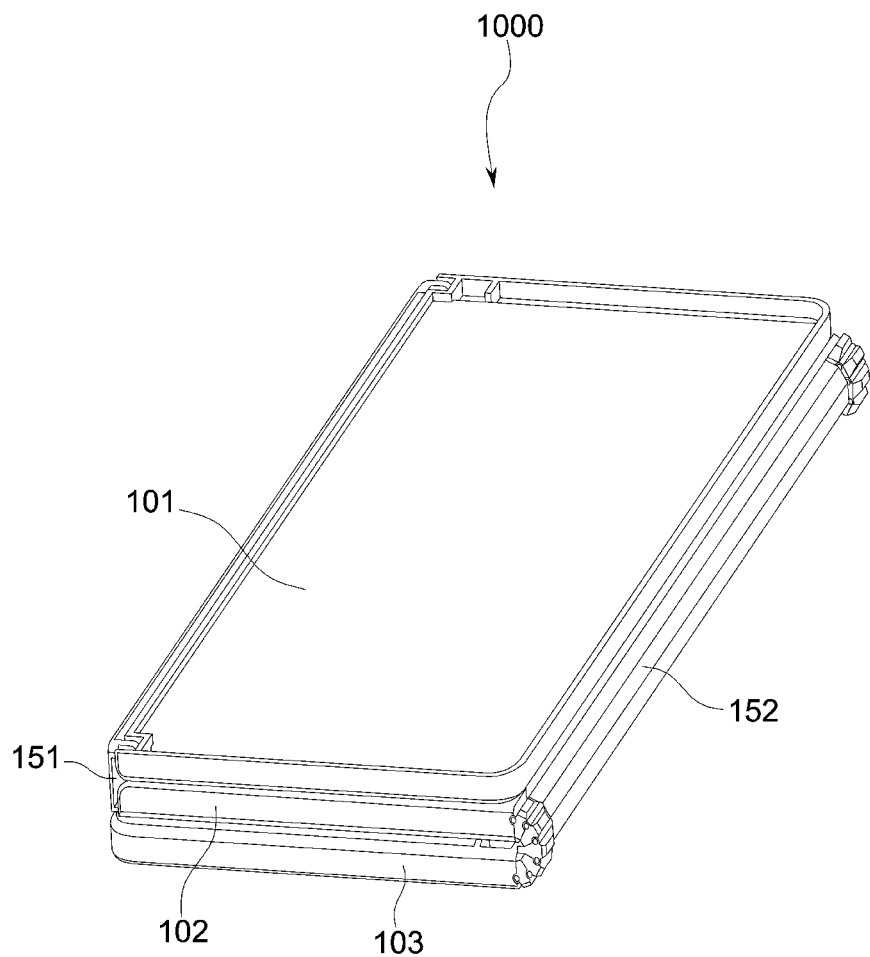
FIG. 20 is a view illustrating an embodiment of a structure of a display device of FIG. 1 which is folded in an S-shape.

FIG. 20 is a view illustrating an embodiment of a structure of the display device 1000 of FIG. 1 which is folded in an S-shape.

As illustrated in FIG. 20, in the display device 1000 that is folded in an S-shape, the first support portion 101 is disposed on the third support portion 103, and the second support portion 102 is disposed on the first support portion 101. In other words, the second support portion 102 is disposed between the third support portion 103 and the first support portion 101 along the Z-axis direction. In such an embodiment, the first angle between the second support portion 102 and the first support portion 101 is substantially zero degree, and the second angle between the second support portion 102 and the third support portion 103 is substantially 360 degrees.

Figure 21:
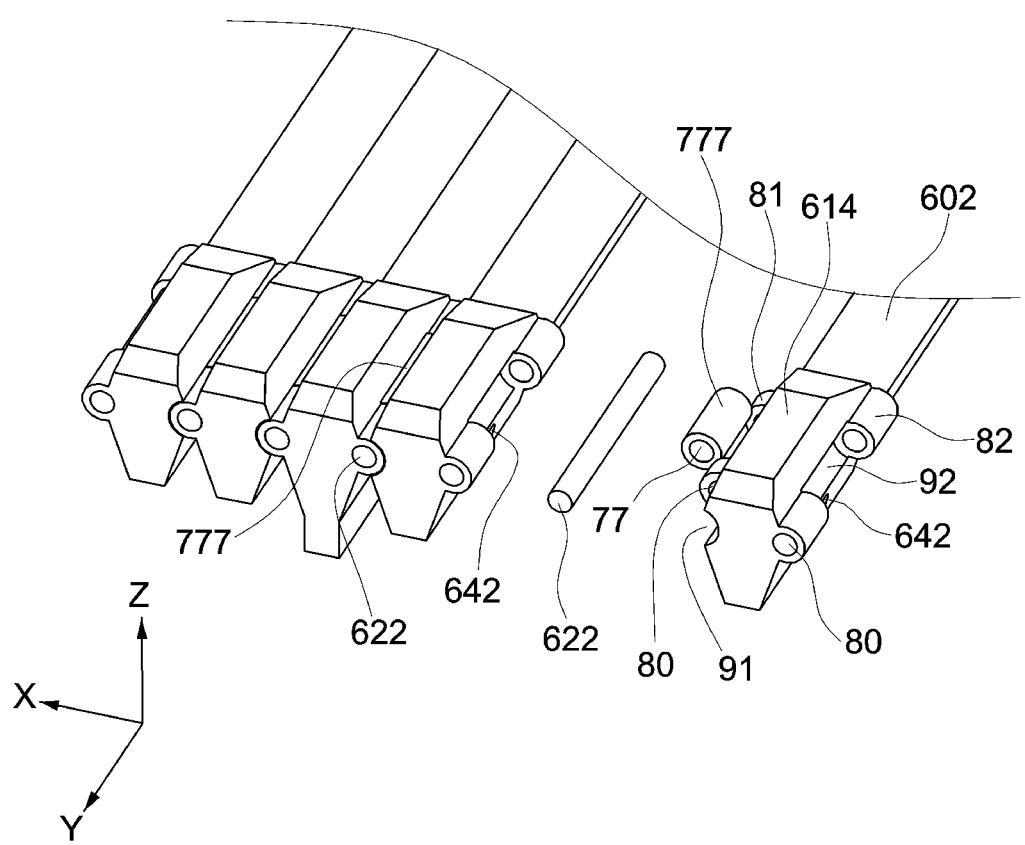
FIG. 21 is an explanatory view illustrating another embodiment of a fourth coupling portion of FIG. 10.

FIG. 21 is an explanatory view illustrating another embodiment of the fourth coupling portion 614 of FIG. 10.

As illustrated in FIG. 21, a magnet 777 may be further disposed between the fourth coupling portions 614. The magnet 777 may have a cylindrical shape defined with a hole 77 through a central portion thereof. The magnet 777 may be disposed at a first depression 91 and/or a second depression 92 of the fourth coupling portion 614. The magnet 777 disposed at the first depression 91 may align hole 77 and holes 80 in projections 81. The magnet 777 disposed at the second depression 92 may align hole 77 and holes 80 in projections 82. With aligned holes as described above, the second connection shaft 622 may be commonly insertable into corresponding holes 80 of the projections 81 and 82 of the fourth coupling portion 614, corresponding depressions 91 and 92 of the fourth coupling portion 614, and a corresponding hole 77 of the magnet 777. In such an embodiment, the above-described second stopper 562 may be attached to the magnet 777, which are respectively aligned with each other to accept a single second connection shaft 622.

In an embodiment, when the magnet 777 is further disposed between the fourth coupling portions 614, the second connection shaft 622 may include a metal material having no magnetism. Since each of the second stoppers 562 may include a metal material, the second stoppers 562 are movable toward the magnet 777 (e.g., in the Z-axis direction) by the magnetism of the magnet 777 relative to the to the second stoppers 562, as similarly described above for the second stoppers 562 and the second connection shafts 622 having magnetism therebetween. That is, magnetic attraction between the magnet 777 and the second stopper 562 biases the second stopper 562 toward an area between adjacent fourth coupling portions 614.

Figure 22:
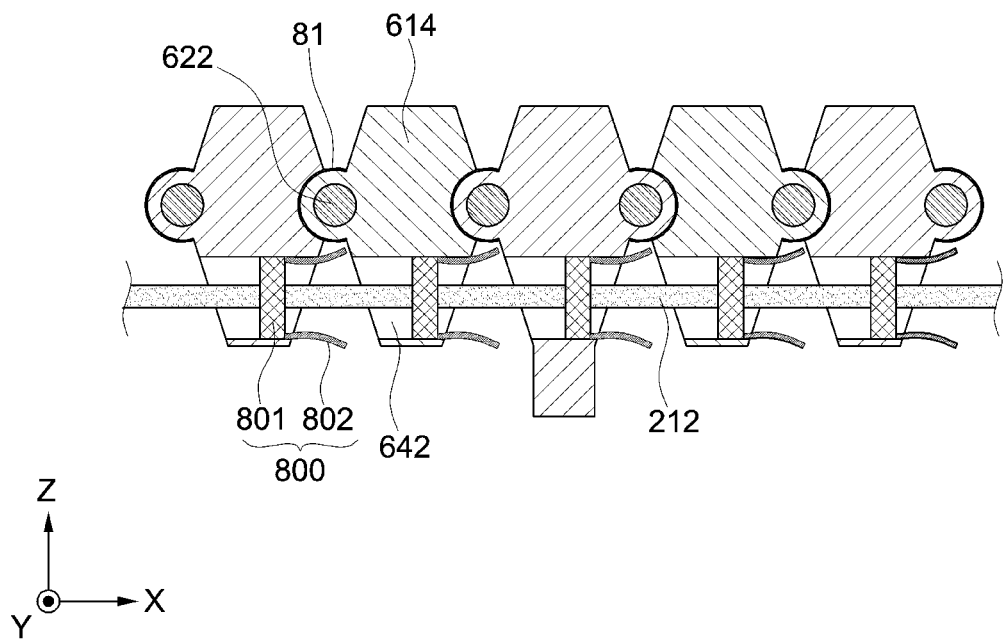
FIGS. 22 and 23 are explanatory views illustrating modified embodiments of a second stopper.
Figure 23:
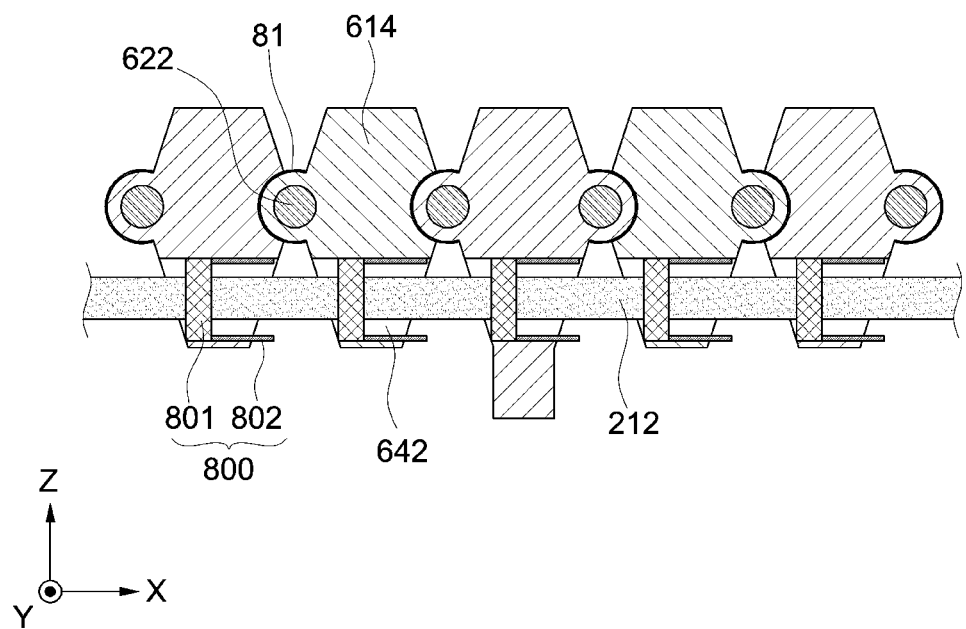

FIGS. 22 and 23 are explanatory views illustrating modified embodiments of the second stopper 562.

As illustrated in FIGS. 22 and 23, the second stopper 800 may include a body portion 801 and a plurality of extension portions 802.

The body portion 801 surrounds an outer circumferential surface of the second wire 212. The body portion 801 may have a circular annular (e.g., loop) shape. A size of the body portion 801 may be substantially equal to or less than a size of the through hole 642 of the fourth coupling portion 614 such that the body portion 801 may be disposed inside the through hole 642.

The extension portions 802 respective extend from the body portion 801 and are disposed on the second wire 212. The extension portion 802 may include a plastic material that is bendable. As illustrated in FIG. 22, when an external force is not applied to the second stopper 800, each extension portion 802 may have a curved shape extended from the body portion 801 which is disposed at a side of the through hole 642 which corresponds to a direction in which the extension portions 802 extend from the body portion 801. Accordingly, a distance between distal ends of the extension portions 802 gradually increases, as a distance away from the body portion 801 increases (e.g., X-axis direction in FIG. 22). As illustrated in FIG. 22, when an external force is not applied to the second stopper 800 and the body portion 801 is towards the right side of the through hole 642, a distance between end portions of the extension portions 802 which are disposed outside the through hole 642 may be greater than a size of the through hole 642 of the fourth coupling portions 614. The extension portions 802 and the body portion 801 may be unitarily formed.

As illustrated in FIG. 22, where the extension portions 802 are disposed between adjacent ones of the fourth coupling portions 614, rotation of the fourth coupling portions 614 may be substantially prevented by interference between the extension portions 802 and the fourth coupling portions 614, while the body portion 801 remains in the through hole 642. Referring to FIG. 22, for example, where a force is applied to move adjacent fourth coupling portions 614 towards each other at lower portions thereof, distal ends of the extension portions 802 would come into contact with one of the adjacent fourth coupling portions 614 to restrict movement of the adjacent fourth coupling portions 614 toward each other.

In an embodiment, as illustrated in FIG. 23 in comparison to the structure of FIG. 22, where the second stopper 800 is disposed in the through hole 642 by having both the body portion 801 and a majority of the extension portions 802 in the through hole 642, the extension portions 802 of the second stopper 800 are transformed to have a substantially straight shape. Where the extension portions 802 have the straight shape and are mostly disposed in the through hole 642 such that protrusion of the distal ends of the extension portions 802 is minimized, a distance between the end portions of the extension portions 802 of the second stopper 800 may be substantially equal to or less than the size of the through hole 642. As illustrated in FIG. 23, when the extension portions 802 of the second stopper 562 have a straight shape, since the extension portions 802 are retracted into the through hole to be disposed in the through holes 642 of the fourth coupling portions 614, the fourth coupling portions 614 may rotate. Referring to FIG. 23, for example, where a force is applied to move adjacent fourth coupling portions 614 towards each other at lower portions thereof, distal ends of the extension portions 802 would not come into contact with one of the adjacent fourth coupling portions 614 and movement of the adjacent fourth coupling portions 614 toward each other would not be blocked.

Referring to FIGS. 22 and 23, a first side of the fourth coupling portion 614 may be closest to the second spring 202 and at a second side of the fourth coupling portion 614 may be furthest from the second spring 202. As such, disposing of the body portion 801 within the fourth coupling portion 614 at the first side thereof, disposes the plurality of extension portions 802 between the adjacent fourth coupling portions 614 which disposes the second hinge portion 152 unrotatable, and disposing of the body portion 801 within the fourth coupling portion 614 at the second side thereof, disposes the plurality of extension portions 802 inside the fourth coupling portion 614 which disposes the second hinge portion 152 rotatable.

FIGS. 24 to 30 are explanatory views illustrating embodiments of a folding operation of the display device 1000 of FIG. 1.

As described in one or more embodiment above, the first hinge controller 171 controls the first hinge portion 151 to be rotatable or unrotatable at the same time the second hinge controller 172 controls the second hinge portion 152 to be rotatable or unrotatable. That is, since the first hinge portion 151 connects the first support portion 101 and the second support portion 102 in a hinge manner, the first hinge controller 171 controls the first support portion 101 and the second support portion 102 to be rotatable or unrotatable relative to each other. Similarly, since the second hinge portion 152 connects the third support portion 103 and the second support portion 102 in a hinge manner, the second hinge controller 172 controls the third support portion 103 and the second support portion 102 to be rotatable or unrotatable relative to each other. An amount or angle of rotation of the third support portion 103 and the second support portion 102 relative to each other, may be defined by an angle at which the first support portion 101 is disposed relative to the second support portion 102, as hereinafter described in the various embodiments of FIGS. 24 to 30.

Figure 24:
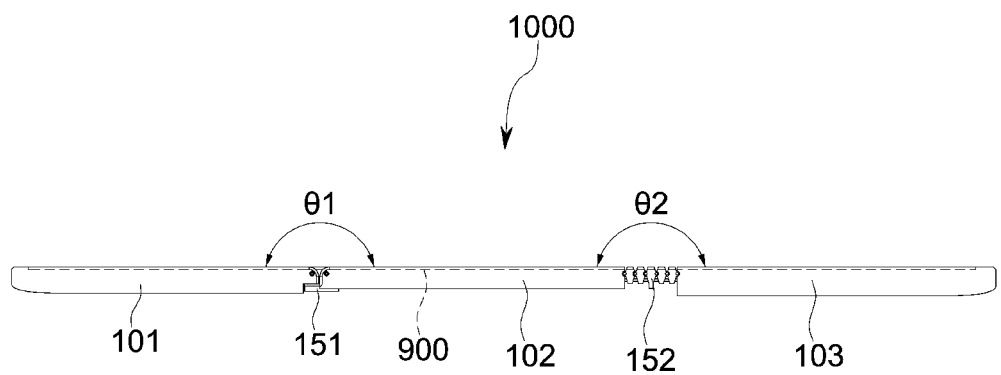
FIGS. 24 to 30 are explanatory views illustrating embodiments of a folding operation of a display device of FIG. 1.
Figure 25:
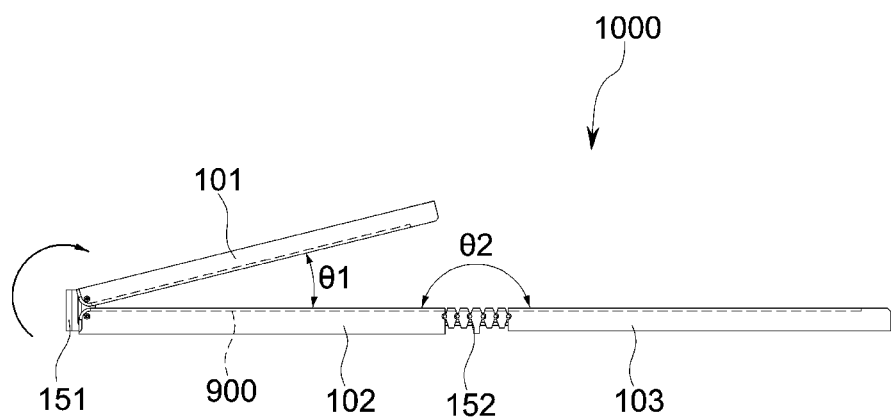
Figure 25:
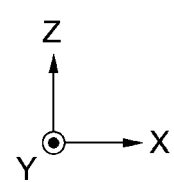

As illustrated in FIGS. 24 and 25, when the first angle θ1 between the second support portion 102 and the first support portion 101 is greater than zero degree and substantially equal to or less than about 180 degrees, at the same time the second angle θ2 between the second support portion 102 and the third support portion 103 is about 180 degrees, the first hinge controller 171 controls the first hinge portion 151 to be rotatable, while the second hinge controller 172 controls the second hinge portion 152 to be unrotatable.

Referring to FIG. 24, for example, when the first angle θ1 is about 180 degrees at the same time the second angle θ2 is about 180 degrees, the securing portion 573 of the first stopper 561 included in the first hinge controller 171 is kept out of being disposed between the teeth of the fourth gear 594 (for example, FIG. 9), and the second stoppers 562 of the second hinge controller 172 are disposed between the fourth coupling portions 614 (for example, FIG. 14 or FIG. 22). At the same time, the second stoppers 562 are attached to the second connection shaft 622 by the magnetic force of the second connection shaft 622 relative to the second stoppers 562. Accordingly, the first rotary shaft 551, the second rotary shaft 552, the third rotary shaft 553, and the fourth rotary shaft 554 of the first hinge portion 151 are kept rotatable. However, the joint portions 600 of the second hinge portion 152 are kept unrotatable.

Referring to FIG. 25, when the first angle θ1 is about 30 degrees at the same time the second angle θ2 is about 180 degrees, the securing portion 573 of the first stopper 561 included in the first hinge controller 171 is kept out of being disposed between the teeth of the fourth gear 594 (for example, FIG. 9), and the second stoppers 562 of the second hinge controller 172 are disposed between the fourth coupling portions 614 (for example, FIG. 14 or FIG. 22).

Specifically, with reference to FIGS. 24 and 25, when the first support portion 101 rotates by a first angle θ1 in a predetermined range toward the support surface 111 of the second support portion 102 (e.g., in the clockwise direction indicated in FIG. 25), a force is applied to the first spring 201 of the first hinge controller 171 to expand the length of the first spring 201 along a rotation direction of the first support portion 101. In an embodiment, since a length of the first spring 201 extends along the rotation direction of the first support portion 101 to essentially absorb the force applied thereto, the first wire 211 of the first hinge controller 171 does not substantially move in the rotation direction of the first support portion 101. Accordingly, since the first wire 211 of the first hinge controller 171 does not substantially move, the securing portion 573 of the first stopper 561 included in the first hinge controller 171 is kept out of being disposed between the teeth of the fourth gear 594 as described above.

At the same time, due to the magnetic force of the second connection shaft 622 within the second hinge controller 172, the second wire 212 thereof does not substantially move. Accordingly, since the second wire 212 of the second hinge controller 172 does not substantially move, the second stoppers 562 of the second hinge controller 172 remain disposed between the fourth coupling portions 614. Since the second stoppers 562 remain disposed between the fourth coupling portions 614, a position of the second wire 212 along the X-axis direction may be maintained which holds the third support portion 103 at about 180 degrees, and the joint portions 600 of the second hinge portion 152 are kept unrotatable. In addition, a second wire 212 may provide a biasing force to the third support portion 103 in clockwise direction, to support the second hinge portion 152 being unrotatable in the counter-clockwise direction. In an embodiment, the first wire 211 and the second wire 212 at the first hinge portion 151 are disposed curved along the rotation direction of the first support portion 101.

That is, the first hinge portion 151 and the second hinge portion 152 are rotatable or unrotatable independently from each other, based on the first angle θ1 between the second support portion 102 and the first support portion 101 together with the second angle θ2 between the second support portion 102 and the third support portion 103.

Referring to FIGS. 24 and 25, the first angle θ1 greater than zero degree and substantially equal to or less than about 180 degrees together with the second angle θ2 of about 180 degrees, operates the hinge controller to dispose the first hinge portion 151 to be rotatable and to dispose the second hinge portion 152 to be unrotatable at the same time.

Figure 26:
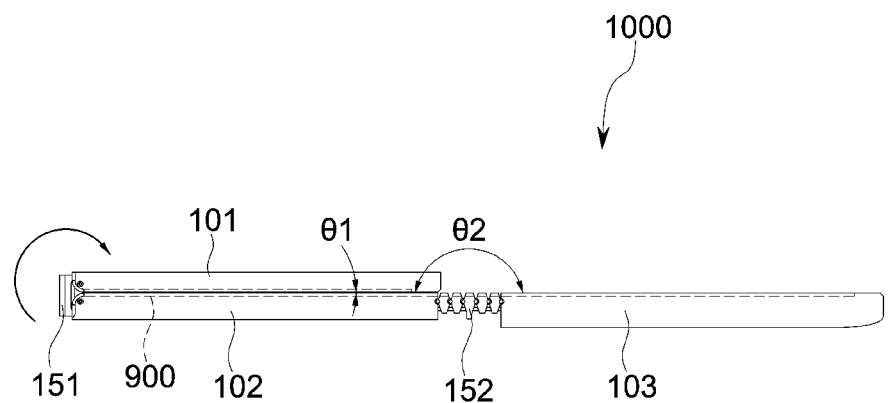
Figure 26:
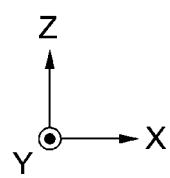

As illustrated in FIG. 26, when the first angle θ1 is zero degree by movement of the first support portion 101 about 180 degrees (e.g., in the clockwise direction indicated in FIG. 26) and the second angle θ2 is about 180 degrees, the first hinge controller 171 controls the first hinge portion 151 to be rotatable, and the second hinge controller 172 controls the second hinge portion 152 to be rotatable.

Referring to FIG. 26, for example, when the first angle θ1 is zero degree at the same time the second angle θ2 is about 180 degrees, the securing portion 573 of the first stopper 561 included in the first hinge controller 171 is kept out of being disposed between the teeth of the fourth gear 594 (for example, FIG. 9), and the second stoppers 562 of the second hinge controller 172 are disposed in the through holes 642 of the fourth coupling portions 614, respectively (for example FIG. 16 or FIG. 23). To be disposed in the through holes 642, the second stoppers 562 may move in the −X-axis direction and be inserted into the through holes 642 of the fourth coupling portions 614, respectively.

Specifically, when the first support portion 101 rotates toward the support surface 111 of the second support portion 102 for the first angle θ1 to become zero degree (e.g., through 180 degrees in the clockwise direction indicated in FIG. 26), the first spring 201 of the first hinge controller 171 is pulled along a rotation direction of the first support portion 101 as described above. Since a length of the first spring 201 is increased along the rotation direction of the first support portion 101, the first wire 211 does not substantially move in the rotation direction of the first support portion 101. Accordingly, the first rotary shaft 551, the second rotary shaft 552, the third rotary shaft 553, and the fourth rotary shaft 554 of the first hinge portion 151 are kept rotatable as described above.

At the same time, when the first angle θ1 is zero degree, a curved portion of the second wire 212 has a substantially minimum curvature at the first hinge portion 151 which applies a force (e.g., a tensile force) to the second wire 212 at the second hinge controller 172. Accordingly, a tensile force of the second wire 212 becomes greater than the magnetic force of the second connection shaft 622 at the second hinge portion 152, and the second wire 212 moves along the rotation direction of the first support portion 101. With reference to FIGS. 14 and 16 (or FIGS. 22 and 23), for example, the second wire 212 may move along the −X-axis direction with respect to the support surface 111 of the second support portion 102. Movement of the second wire 212 along the −X-axis applies a force to the second spring 202 such that a length of the second spring 202 extends along the rotation direction of the first support portion 101. Accordingly, the second stoppers 562 of the second hinge controller 172 which are attached to the second wire 212 may move together with the second wire 212 be disposed in the through holes 642 of the fourth coupling portions 614, respectively and the joint portions 600 of the second hinge portion 152 are kept rotatable. In an embodiment, the first wire 211 and the second wire 212 at the first hinge portion 151 are disposed curved along the rotation direction of the first support portion 101.

Referring to FIG. 26, the first angle θ1 of zero degree together with the second angle θ2 of about 180 degrees, operates the hinge controller to dispose each of the first hinge portion 151 and the second hinge portion 152 to be rotatable at the same time.

Taking FIGS. 24 to 27 together, from the display device 1000 which is unfolded as shown in FIG. 24 to have the first support portion 101, the second support portion 102, and the third support portion 103 form about 180 degrees, the third support portion 103 may not rotate in an in-folding manner toward the second support portion 102 (e.g., counterclockwise at the second hinge portion 152) before the first support portion 101 is maximally in-folded toward the second support portion 102 (e.g., clockwise at the first hinge portion 151) to be disposed substantially at zero degree with respect to the second support portion 102. In other words, the third support portion 103 may not rotate in the in-folding manner before the first angle θ1 reaches substantially zero degree. Accordingly, interference by the third support portion 103 to in-folding of the first support portion 101 relative to the second support portion 102, may be substantially prevented while the first support portion 101 is in-folded. Accordingly, damage to the display panel 900, the first hinge portion 151, and the second hinge portion 152 due to the interference between the first support portion 101 and the third support portion 103 may be substantially prevented.

Figure 27:
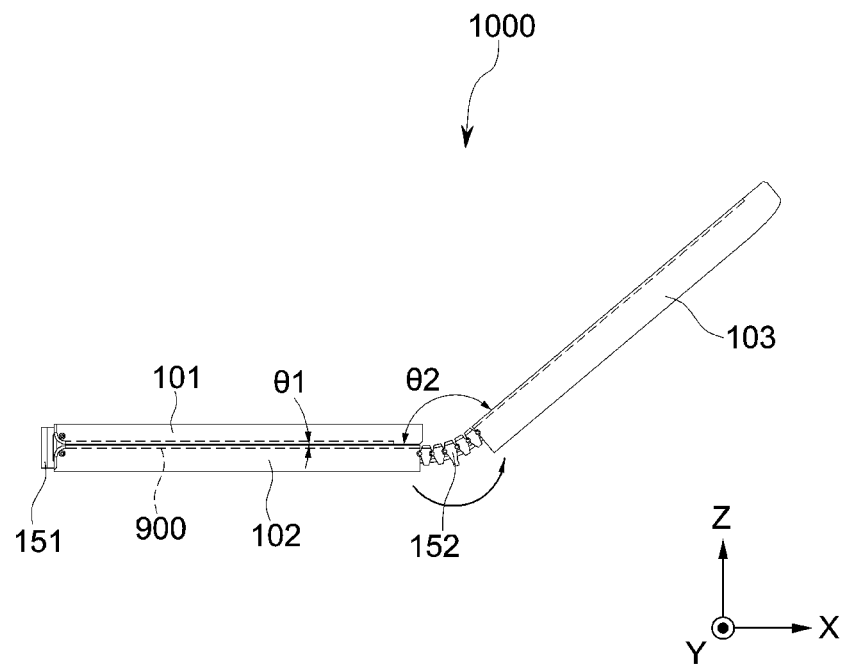
Figure 28:
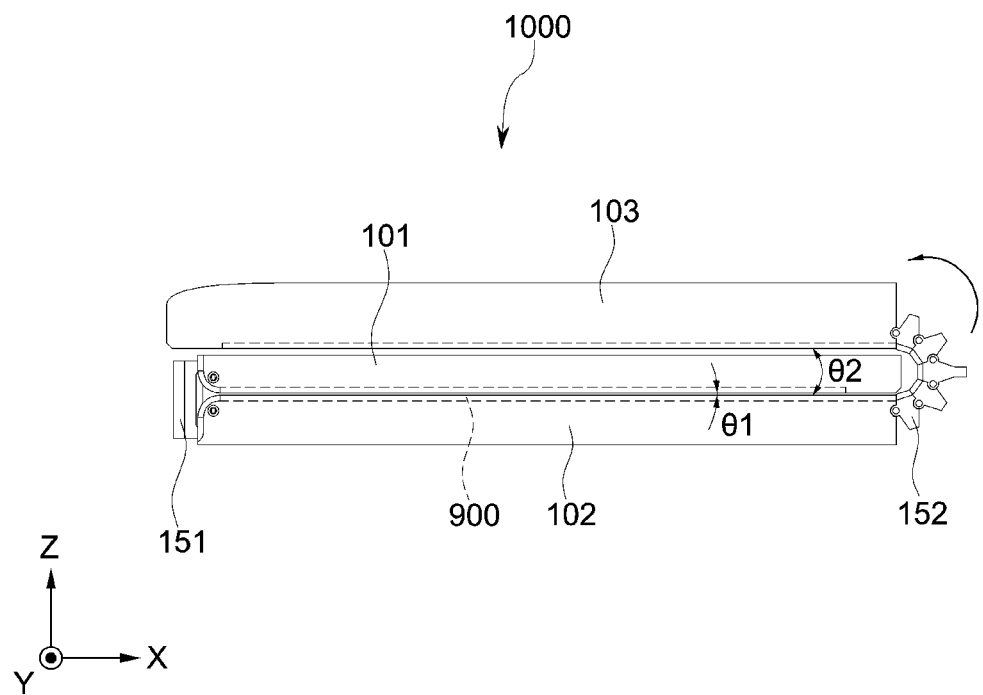

As illustrated in FIGS. 27 and 28, when the first angle θ1 is zero degree and the second angle θ2 is substantially equal to or greater than zero degree and less than about 180 degrees, the first hinge controller 171 controls the first hinge portion 151 to be unrotatable, and the second hinge controller 172 controls the second hinge portion 152 to be rotatable.

Referring to FIG. 27, when the first angle θ1 is zero degree at the same time the second angle θ2 is about 135 degrees, the securing portion 573 of the first stopper 561 included in the first hinge controller 171 is disposed between the teeth of the fourth gear 594 (for example, FIG. 8) such that the first hinge portion 151 is unrotatable, and the second stoppers 562 of the second hinge controller 172 are disposed in the through holes 642 of the fourth coupling portions 614, respectively (for example, FIG. 16 or 23), such that the second hinge portion 152 is rotatable. As described above, the second stoppers 562 may move in the −X-axis direction and be inserted into the through holes 642 of the fourth coupling portions 614, respectively.

Specifically, the first wire 211 moves along a rotation direction of the third support portion 103. In an embodiment, for example, the first wire 211 moves in the X-axis direction with respect to the support surface 111 of the second support portion 102. Accordingly, the first stopper 561 in the first coupling portion 511 of the first hinge portion 151 rotates counterclockwise. Then, the securing portion 573 of the first stopper 561 may be disposed between the teeth of the fourth gear 594 such that the first hinge portion 151 is unrotatable. Accordingly, the first rotary shaft 551, the second rotary shaft 552, the third rotary shaft 553, and the fourth rotary shaft 554 of the first hinge portion 151 are kept unrotatable.

At the same time, since a length of the second spring 202 extends along the rotation direction of the third support portion 103, the second wire 212 does not substantially move along the X-axis direction in the rotation direction of the third support portion 103. As such, the second stoppers 562 of the second hinge controller 172 which are attached to the second wire 212 are maintained in the through holes 642 of the fourth coupling portions 614 and the joint portions 600 of the second hinge portion 152 are kept rotatable. In an embodiment, the first wire 211 and the second wire 212 at the second hinge portion 152 are disposed curved along the rotation direction of the third support portion 103.

Referring to FIG. 28, when the first angle θ1 is zero degree at the same time the second angle θ2 is about degree, the securing portion 573 of the first stopper 561 included in the first hinge controller 171 are disposed between the teeth of the fourth gear 594 such that the first hinge portion 151 is unrotatable, and the second stoppers 562 of the second hinge controller 172 are disposed in the through holes 642 of the fourth coupling portions 614, respectively. As described above, the second stoppers 562 may move in the −X-axis direction and be inserted in the through holes 642 of the fourth coupling portions 614, respectively, such that the second hinge portion 152 is rotatable.

Specifically, the first wire 211 moves along a rotation direction of the third support portion 103. In an embodiment, the first wire 211 moves in the X-axis direction with respect to the support surface 111 of the second support portion 102. Accordingly, the first stopper 561 in the first coupling portion 511 rotates counterclockwise. Then, the securing portion 573 of the first stopper 561 may be disposed between the teeth of the fourth gear 594. Accordingly, the first rotary shaft 551, the second rotary shaft 552, the third rotary shaft 553, and the fourth rotary shaft 554 of the first hinge portion 151 are kept unrotatable.

At the same time, since the second spring 202 extends along the rotation direction of the third support portion 103, the second wire 212 does not substantially move in the rotation direction of the third support portion 103. As such, the second stoppers 562 of the second hinge controller 172 which are attached to the second wire 212 are maintained in the through holes 642 of the fourth coupling portions 614 and the joint portions 600 of the second hinge portion 152 are kept rotatable. In an embodiment, the first wire 211 and the second wire 212 on at second hinge portion 152 are disposed curved along the rotation direction of the third support portion 103.

Referring to FIGS. 27 and 28, the first angle θ1 of zero degree together with the second angle θ2 less than about 180 degrees, operates the hinge controller to dispose the first hinge portion 151 to be unrotatable and to dispose the second hinge portion 152 to be rotatable at the same time.

In the display device 1000 having the first angle θ1 at zero degree, the third support portion 103 may be rotatable above a plane of the second support portion 102 in either the in-folding (e.g., counterclockwise direction) or out-folding manner (e.g., clockwise direction) while at the same time the first support portion 101 may not rotate in the out-folding manner (e.g., counterclockwise direction). Accordingly, interference by the first support portion 101 may be substantially prevented while the third support portion 103 is in-folded toward the second support portion 102. Accordingly, damage to the display panel 900, the first hinge portion 151, and the second hinge portion 152 due to the interference between the first support portion 101 and the third support portion 103 during in-folding thereof may be substantially prevented.

Figure 29:
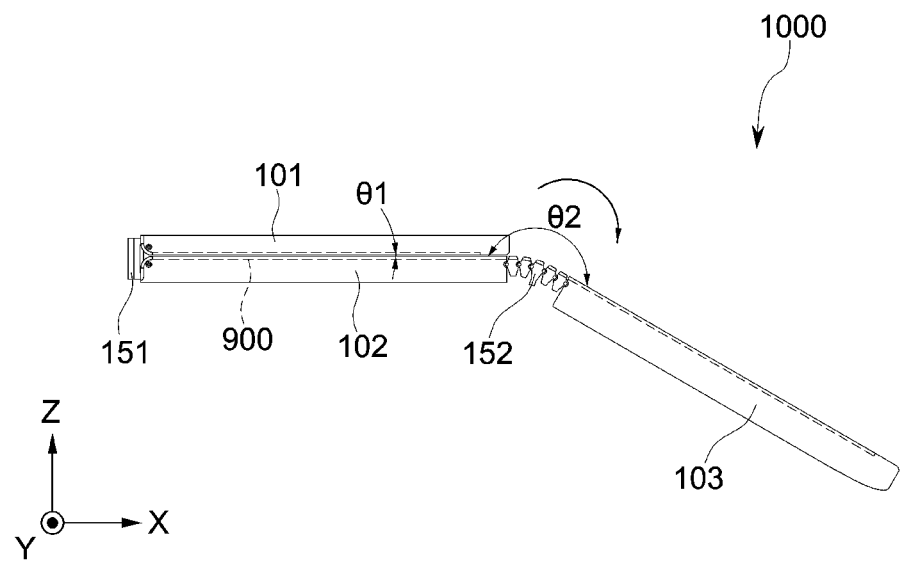
Figure 30:
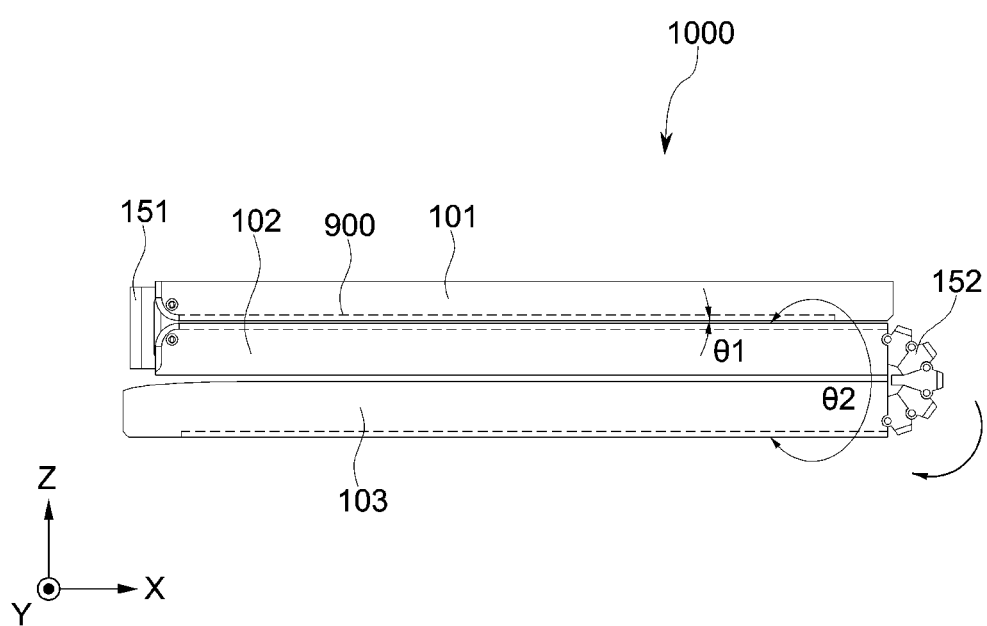

As illustrated in FIGS. 29 and 30, when the first angle θ1 is zero degree and the second angle θ2 is greater than about 180 degrees and substantially equal to or less than about 360 degrees with respect to the third support portion 103 starting at zero degree relative to the second support portion 102 (FIG. 28), the first hinge controller 171 controls the first hinge portion 151 to be unrotatable, and the second hinge controller 172 controls the second hinge portion 152 to be rotatable.

Referring to FIG. 29, when the first angle θ1 is zero degree at the same time the second angle θ2 is about 225 degree with respect to the third support portion 103 starting at zero degree relative to the second support portion 102 (FIG. 28), the securing portion 573 of the first stopper 561 included in the first hinge controller 171 is disposed between the teeth of the fourth gear 594, and the second stoppers 562 of the second hinge controller 172 are disposed in the through holes 642 of the fourth coupling portions 614, respectively. In an embodiment, the second stoppers 562 may move in the −X-axis direction and be inserted into the through holes 642 of the fourth coupling portions 614, respectively, as described above.

Specifically, the first wire 211 moves along a rotation direction of the third support portion 103, for example, in the X-axis direction with respect to the support surface 111 of the second support portion 102. Accordingly, the first stopper 561 in the first coupling portion 511 rotates counterclockwise. Then, the securing portion 573 of the first stopper 561 may be disposed between the teeth of the fourth gear 594. Accordingly, the first rotary shaft 551, the second rotary shaft 552, the third rotary shaft 553, and the fourth rotary shaft 554 of the first hinge portion 151 are kept unrotatable.

At the same time, since the second spring 202 extends along the rotation direction of the third support portion 103, the second wire 212 does not substantially move in the rotation direction of the third support portion 103 and the joint portions 600 of the second hinge portion 152 are kept rotatable. In an embodiment, the first wire 211 and the second wire 212 at the second hinge portion 152 are disposed curved along the rotation direction of the third support portion 103.

Referring to FIG. 30, when the first angle θ1 is zero degree at the same time the second angle θ2 is about 360 degrees with respect to the third support portion 103 starting at zero degree relative to the second support portion 102 (FIG. 28), the securing portion 573 of the first stopper 561 included in the first hinge controller 171 is disposed between the teeth of the fourth gear 594, and the second stoppers 562 of the second hinge controller 172 are disposed in the through holes 642 of the fourth coupling portions 614, respectively. In an embodiment, the second stoppers 562 may move in the −X-axis direction and be inserted into the through holes 642 of the fourth coupling portions 614, respectively, as described above.

Specifically, the first wire 211 moves along a rotation direction of the third support portion 103, such as in the X-axis direction with respect to the support surface 111 of the second support portion 102. Accordingly, the first stopper 561 in the first coupling portion 511 rotates counterclockwise. Then, the securing portion 573 of the first stopper 561 may be disposed between the teeth of the fourth gear 594. Accordingly, the first rotary shaft 551, the second rotary shaft 552, the third rotary shaft 553, and the fourth rotary shaft 554 of the first hinge portion 151 are kept unrotatable.

At the same time, since the second spring 202 extends along the rotation direction of the third support portion 103, the second wire 212 does not substantially move in the rotation direction of the third support portion 103 and the joint portions 600 of the second hinge portion 152 are kept rotatable. In an embodiment, the first wire 211 and the second wire 212 at the second hinge portion 152 are disposed curved along the rotation direction of the third support portion 103.

Referring to FIGS. 29 and 30, the first angle θ1 of zero degree together with the second angle θ2 greater than about 180 degrees and substantially equal to or less than about 360 degrees, operates the hinge controller to dispose the first hinge portion 151 to be unrotatable and to dispose the second hinge portion 152 to be rotatable at the same time.

As shown in FIGS. 24 to 30, the display panel 900 moves together with the first support portion 101 and the third support portion 103 during respective folding of the first support portion 101 and the third support portion 103 relative to the second support portion 102.

As set forth hereinabove, the display device according to one or more embodiments may provide the following effects.

In the display device according to one or more embodiments, whether each of the first support portion and/or the third support portion is rotatable or unrotatable is controlled based on a first angle between the first support portion and the second support portion together with a second angle between the third support portion and the second support portion. Accordingly, when the first support portion and the third support portion are folded, interference between the first support portion and the third support portion relative to each other may be substantially prevented. Accordingly, interference between the display panel, the first hinge portion, and the second hinge portion may be substantially prevented from being damaged when the display device is folded.

As set forth hereinabove, the display device according to one or more embodiments may provide the following effects.

While the invention has been illustrated and described with reference to the embodiments thereof, it will be apparent to those of ordinary skill in the art that various changes in form and detail may be made thereto without departing from the spirit and scope of the invention.

What is claimed is:

1. A display device comprising:
    a panel support portion comprising a first support portion, a second support portion, and a third support portion;
    a first hinge portion connecting the first support portion and the second support portion;
    a second hinge portion connecting the second support portion and the third support portion;
    a flexible display panel disposed on the panel support portion; and
    a hinge controller controlling each of the first hinge portion and the second hinge portion to be rotatable or unrotatable based on a first angle between the second support portion and the first support portion together with a second angle between the second support portion and the third support portion,
    wherein when the first angle is greater than zero degree, the hinge controller controls the first hinge portion to be rotatable and controls the second hinge portion to be unrotatable.

2. The display device of claim 1, wherein the first hinge portion comprises:
    a first coupling portion connected to a first connection portion of the first support portion and a first connection portion of the second support portion; and
    a second coupling portion connected to a second connection portion of the first support portion and a second connection portion of the second support portion.

3. The display device of claim 2, wherein the second hinge portion comprises:
    a plurality of third coupling portions connected to a third connection portion of the second support portion and a first connection portion of the third support portion; and
    a plurality of fourth coupling portions connected to a fourth connection portion of the second support portion and a second connection portion of the third support portion.

4. The display device of claim 1, wherein the first angle is in a range from about zero degree to about 180 degrees, and the second angle is in a range from about zero degree to about 360 degrees.

5. The display device of claim 4, wherein when the first angle is greater than about zero degree and substantially equal to or less than about 180 degrees, and the second angle is about 180 degrees, the hinge controller controls the first hinge portion to be rotatable, and controls the second hinge portion to be unrotatable.

6. The display device of claim 4, wherein when the first angle is about zero degree, and the second angle is about 180 degrees, the hinge controller controls each of the first hinge portion and the second hinge portion to be rotatable.

7. The display device of claim 4, wherein when the first angle is about zero degree, and the second angle is less than about 180 degrees, the hinge controller controls the first hinge portion to be unrotatable in the counterclockwise direction from the second hinge portion, and controls the second hinge portion to be rotatable.

8. The display device of claim 4, wherein when the first angle is about zero degree, and the second angle is greater than about 180 degrees and substantially equal to or less than about 360 degrees, the hinge controller controls the first hinge portion to be unrotatable in the counterclockwise direction from the second hinge portion, and controls the second hinge portion to be rotatable.

9. The display device of claim 1, wherein the hinge controller is connected to each of the first hinge portion and the second hinge portion.

10. The display device of claim 1, wherein the hinge controller is directly connected to each of the first hinge portion and the second hinge portion.

11. The display device of claim 1, wherein the hinge controller extends from the first support portion to the third support portion and is connected to each of the first hinge portion and the second hinge portion.

12. The display device of claim 1, wherein a number of a hinge axis of the first hinge portion is different from a number of a hinge axis of the second hinge portion.

13. A display device comprising:
    a panel support portion comprising a first support portion, a second support portion, and a third support portion;
    a first hinge portion connecting the first support portion and the second support portion;
    a second hinge portion connecting the second support portion and the third support portion;
    a flexible display panel disposed on the panel support portion; and
    a hinge controller controlling each of the first hinge portion and the second hinge portion to be rotatable or unrotatable based on a first angle between the second support portion and the first support portion and a second angle between the second support portion and the third support portion,
    wherein the first hinge portion comprises:
        a first coupling portion connected to a first connection portion of the first support portion and a first connection portion of the second support portion; and
        a second coupling portion connected to a second connection portion of the first support portion and a second connection portion of the second support portion, wherein the second hinge portion comprises:
        a plurality of third coupling portions connected to a third connection portion of the second support portion and a first connection portion of the third support portion; and
        a plurality of fourth coupling portions connected to a fourth connection portion of the second support portion and a second connection portion of the third support portion,
    wherein the hinge controller comprises:
        a first hinge controller connected to the first coupling portion and the plurality of third coupling portions; and
        a second hinge controller connected to the second coupling portion and the plurality of fourth coupling portions.

14. The display device of claim 13, wherein the first hinge controller comprises:
    a first stopper disposed in the first coupling portion;
    a first spring connected to the first support portion; and
    a first wire extending from the first spring to pass through through holes of the first coupling portion, a support hole of the first stopper, and through holes of the plurality of third coupling portions, and connected to the third support portion.

15. The display device of claim 14, wherein the first coupling portion comprises:
a first rotary shaft connected to the first connection portion of the first support portion;
a second rotary shaft connected to the first connection portion of the second support portion;
a first gear comprising a shaft connected to the first rotary shaft;
a second gear comprising a shaft connected to the second rotary shaft;
a third gear connected to the first gear; and
a fourth gear connected to the third gear and the second gear.

16. The display device of claim 15, wherein the first stopper comprises:
a body portion rotatably coupled to the first coupling portion;
a support portion protruding from one end portion of the body portion, and having the support hole; and
a securing portion protruding from another end portion of the body portion, and disposed between the first gear and the second gear.

17. The display device of claim 14, wherein a diameter of each of the through holes of the plurality of third coupling portions is greater than a diameter of the first wire.

18. The display device of claim 14, wherein the second hinge controller comprises:
a second spring connected to the third support portion;
a second wire extending from the second spring to pass through through holes of the plurality of fourth coupling portions and through holes of the second coupling portion, and connected to the first support portion; and
a plurality of second stoppers disposed between the fourth coupling portions or in the through holes of the fourth coupling portions, and protruding from the second wire.

19. The display device of claim 18, further comprising a plurality of connection shafts disposed between adjacent ones of the fourth coupling portions, and hingedly connecting the adjacent ones of the fourth coupling portions.

20. The display device of claim 19, wherein the plurality of connection shafts have magnetic properties, and the second stoppers comprise a metal material.

21. The display device of claim 19, further comprising a plurality of magnets surrounding the plurality of connection shafts, wherein the second stoppers comprise a metal material.

22. The display device of claim 18, wherein the second stopper comprises:
a body portion; and
a plurality of extension portions extending from the body portion and having a curved or straight shape.

23. The display device of claim 18, wherein a diameter of each of the through holes of the plurality of fourth coupling portions is greater than a diameter of the second wire.

24. A display device comprising:
a panel support portion comprising n number of support portions, n being a natural number greater than 2;
n-1 number of hinge portions connecting adjacent ones of the support portions;
a flexible display panel disposed on the panel support portion; and
a hinge controller controlling the n-1 number of hinge portions to be rotatable or unrotatable based on an angle between adjacent ones of the support portions,
wherein when the first angle is greater than zero degree, the hinge controller controls the first hinge portion to be rotatable and controls the second hinge portion to be unrotatable.

25. A display device comprising:
a panel support portion comprising a first support portion, a second support portion and a third support portion in order;
a first angle at which the first support portion is rotatable relative to the second support portion, the first angle in a range from about zero degree to about 180 degrees,
a second angle at which the third support portion is rotatable relative to the second support portion, the second angle in a range from about zero degree to about 360 degrees;
a first hinge portion which connects the first support portion to the second support portion;
a second hinge portion which connects the second support portion to the third support portion; and
a flexible display panel rotatable together with the first support portion, the second support portion and the third support portion, respectively,
wherein
the first angle together with the second angle defines each of the first hinge portion and the second hinge portion as rotatable or unrotatable, and
when the first angle is greater than zero degree, the hinge controller controls the first hinge portion to be rotatable and controls the second hinge portion to be unrotatable.

* * * * *